United States Patent
Minagawa et al.

(10) Patent No.: US 7,792,369 B2
(45) Date of Patent: Sep. 7, 2010

(54) FORM PROCESSING METHOD, FORM PROCESSING DEVICE, AND COMPUTER PRODUCT

(75) Inventors: Akihiro Minagawa, Kawasaki (JP); Hiroaki Takebe, Kawasaki (JP); Katsuhito Fujimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 966 days.

(21) Appl. No.: 11/599,685

(22) Filed: Nov. 15, 2006

(65) Prior Publication Data

US 2008/0025618 A1     Jan. 31, 2008

(30) Foreign Application Priority Data

Jul. 31, 2006     (JP)     ............... 2006-209065

(51) Int. Cl.
   *G06K 9/72* (2006.01)
(52) U.S. Cl. ............... 382/229; 382/228; 382/231; 382/185; 382/187; 382/190; 382/192; 382/198
(58) Field of Classification Search ............... 382/229, 382/228, 231, 185, 187, 190, 192, 198
   See application file for complete search history.

(56) References Cited

U.S. PATENT DOCUMENTS 6,374,209 B1 *    4/2002    Yoshimi et al. ............... 704/9

2002/0003901 A1    1/2002    Kawaoka et al.

FOREIGN PATENT DOCUMENTS

| CN | 1325081 A | 12/2001 |
|---|---|---|
| JP | 2005-275830 | 10/2005 |

OTHER PUBLICATIONS

Watanabe; "Layout Recognition of Multi-Kinds of Table-Form Documents"; IEEE Trans. on Pattern Analysis and Machine Intelligence, vol. 17, No. 4; pp. 432-445; Apr. 1995.

Tuganbaev et al.; "Universal Data Capture Technology from Semi-structured Forms"; Proceedings of the 2005 Eight Int'l. Conference on Document Analysis and Recognition; pp. 458-462; 2005.

* cited by examiner

*Primary Examiner*—Matthew C Bella
*Assistant Examiner*—Mike Rahmjoo
(74) *Attorney, Agent, or Firm*—Greer, Burns & Crain, Ltd.

(57) ABSTRACT

A form processing apparatus extracts layout information and character information from a form document. A candidate extracting unit extracts word candidates from the character information. A frequency digitizing unit calculates emission probability of a word candidate from each element. A relation digitizing unit calculates transition probability that relationship between word candidates is established. An evaluating unit calculates an evaluation value indicative of a probability of appearance of word candidates in respective logical elements. A determining unit determines the element and a word candidate thereof as the element and a character string thereof in the form document, based on the evaluation value.

12 Claims, 32 Drawing Sheets

FIG.2

| C1 | C2 | | |
|---|---|---|---|
| FULL NAME | フリガナ [FURIGANA] | フジ [fuji] | タロウ [tarou] |
| | (FAMILY NAME) (FIRST NAME)  C3<br><br>富士 [FUJI]　　太郎 [TAROU] | | |

FIG.3

| | 1 | 2 | 3 | 4 |
|---|---|---|---|---|
| a | | フリガナ [FURIGANA] | フジ [fuji] | タロウ [tarou] |
| b | FULL | | (FAMILY NAME) | (FIRST NAME) |
| c | | | | |
| d | NAME | | | |
| e | | | 富士 [FUJI] | 太郎 [TAROU] |
| f | | | | |

FIG.4

| FULL<br>0<br><br>NAME<br>1 | フリガナ<br>2　3　4　5<br>[fu·ri·ga·na] | フジ<br>6　7<br>[fu·ji] | タロウ<br>8　9　10<br>[ta·ro·u] |
|---|---|---|---|
| | (FAMILY NAME)　(FIRST NAME)<br>11　　12　　13 14　　15　　16<br><br>富士　　　太郎<br>17　18　　　19　20<br>[FU·JI]　　　[TA·ROU] | | |

| CELL | BOX | VERTEXES | VERTEX COORDINATES |
|---|---|---|---|
| C1 | a1,b1,c1,d1,e1,f1 | 4 | ... |
| C2 | a2,a3,a4 | 4 | ... |
| C3 | b2,b3,b4<br>c2,c3,c4<br>d2,d3,d4<br>e2,e3,e4<br>f2,f3,f4 | 4 | ... |

| CHARACTER NUMBER | CHARACTER CODE | CELL | CO ORDINATES | FONT | SIZE |
|---|---|---|---|---|---|
| 0 | FULL | C1 | ... | GOTHIC | 11 |
| 1 | NAME | | ... | | |
| 2 | フ [FU] | C2 | ... | | |
| 3 | リ [RI] | | ... | | |
| 4 | ガ [GA] | | ... | | |
| 5 | ナ [NA] | | ... | | |
| 6 | フ [fu] | | ... | | |
| 7 | ジ [ji] | | ... | | |
| 8 | タ [ta] | | ... | | |
| 9 | ロ [ro] | | ... | | |
| 10 | ウ [u] | | ... | | |
| 11 | ( | C3 | ... | | |
| 12 | FAMILY NAME | | ... | | |
| 13 | ) | | ... | | |
| 14 | ( | | ... | | |
| 15 | FIRST NAME | | ... | | |
| 16 | ) | | ... | | |
| 17 | 富 [FU] | | ... | | 16 |
| 18 | 士 [JI] | | ... | | |
| 19 | 太 [TA] | | ... | | |
| 20 | 郎 [ROU] | | ... | | |

| ELEMENT NUMBER | REPRESENTATIVE CHARACTER STRING | ATTRIBUTE | CORRESPNDING CHARACTER STRING | PARENT ELEMENT NUMBER |
|---|---|---|---|---|
| 0 | FULL NAME | HEADING | NAME, FULL NAME | NULL |
| 1 | FAMILY NAME | HEADING | FAMILY NAME, LAST NAME | 0 |
| 2 | FIRST NAME | HEADING | FIRST NAME | 0 |
| 3 | FAMILY NAME | DATA | * | 1 |
| 4 | FIRST NAME | DATA | * | 2 |
| 5 | フリガナ | HEADING | READING, PRONUNCIATION | 0 |
| 6 | FAMILY NAME フリガナ | HEADING | FAMILY NAME, LAST NAME | 5 |
| 7 | FIRST NAME フリガナ | HEADING | FIRST NAME | 5 |
| 8 | PRONUNCIATION OF FAMILY NAME | DATA | *ONLY STRING OF KANA (EXPRESSED IN LOWER CASE LETTERS) | 6 |
| 9 | PRONUNCIATION OF FIRST NAME | DATA | *ONLY STRING OF KANA (EXPRESSED IN LOWER CASE LETTERS) | 7 |

| ELEMENT NUMBER i | CHARACTER STRING NUMBER j | CORRE-SPONDING CHARACTER STRING | EMISSION FREQUENCY p1 (i,j) |
|---|---|---|---|
| 0 | 0 | NAME | 0.3 |
|  | 1 | FULL NAME | 0.7 |
|  | 2 | NULL | 0 |
| 1 | 0 | FAMILY NAME | 0.5 |
|  | 1 | FULL | 0.1 |
|  | 2 | NULL | 0.4 |
| ⋮ | ⋮ | ⋮ | ⋮ |

| ELEMENT NUMBER PAIR | RELATIVE POSITIONAL INFORMATION | | CONNECTION FREQUENCY | |
|---|---|---|---|---|
|  | HORIZONTAL DISTANCE h | VERTICAL DISTANCE v | | |
| 0, 1 | 0 | -1 | 0.00 | ← (a) |
|  | 0 | 0 | 0.10 | ← (b) |
|  | 0 | 1 | 0.15 | ← (c) |
|  | 0 | 2 | 0.05 | ← (d) |
|  | 1 | 0 | 0.30 | ← (e) |
|  | 1 | 1 | 0.00 | ← (f) |
| 0, 2 | 0 | -1 | 0.30 | |
| 1, 1 | 0 | -1 | 0.00 | |
|  | 0 | 0 | 0.30 | |
|  | 0 | 1 | 0.15 | |
|  | 0 | 2 | 0.05 | |
|  | 1 | 0 | 0.10 | |
|  | 1 | 1 | 0.00 | |
| ⋮ | ⋮ | ⋮ | ⋮ | |

| ELEMENT NUMBER i | CHARACTER STRING NUMBER j | WORD CANDIDATE NUMBER k | EXTRACTED CHARACTER STRING | NUMBER OF CHARACTERS | CHARACTER NUMBER | EMISSION PROBABILITY p3(i,j,k) | NORMALIZED EMISSION PROBABILITY p3'(i,j,k) |
|---|---|---|---|---|---|---|---|
| 0 | 1 | 0 | FULL NAME (FIRST NAME) | 2 | 0,1 | 0.7 | 0.67 |
| 0 | 1 | 1 | | 1 | 15 | 0.35 | 0.33 |
| 0 | 2 | 0 | NULL | | | 0.00 | 0 |
| 1 | 0 | 0 | (FAMILY NAME) | 1 | 12 | 0.6 | 0.6 |
| 1 | 2 | 0 | NULL | | | 0.4 | 0.4 |
| 2 | 0 | 0 | FULL NAME (FIRST NAME) | 2 | 1 | 0.25 | 0.2 |
| 2 | 0 | 1 | | 1 | 15 | 0.5 | 0.4 |
| 2 | 1 | 2 | NULL | | | 0.4 | 0.4 |
| 3 | 0 | 0 | FULL NAME フジ | 1 | 0,1 | 0.9 | 0.18 |
| 3 | 0 | 1 | タロウ | 2 | 6,7 | 0.9 | 0.18 |
| 3 | 0 | 2 | 富士 | 3 | 8,9,10 | 0.9 | 0.18 |
| 3 | 0 | 3 | 太郎 | 2 | 17,18 | 0.9 | 0.18 |
| 3 | 0 | 4 | | 2 | 19,20 | 0.9 | 0.18 |
| 3 | 1 | 0 | NULL | | | 0.1 | 0.1 |

FIG.18

| ELEMENT Ei | WORD CANDIDATE Wk (EXTRACTED CHARACTER STRING) | | | | | |
|---|---|---|---|---|---|---|
| ELEMENT E0 | FULL NAME | FIRST NAME | NULL | | | |
| ELEMENT E1 | FAMILY NAME | NULL | | | | |
| ELEMENT E2 | FULL NAME | フジ [fuji] | タロウ [tarou] | 富士 [FUJI] | 太郎 [TAROU] | NULL |

FIG.20

| PARENT ELEMENT NUMBER i1 | CHARACTER STRING NUMBER j1 | WORD CANDIDATE NUMBER k1 | CHILD ELEMENT NUMBER i2 | CHARACTER STRING NUMBER j2 | WORD CANDIDATE NUMBER k2 | TRANSITION PROBABILITY p4 | NORMALIZED TRANSITION PROBABILITY p4' |
|---|---|---|---|---|---|---|---|
| 0 | 1 | 0 | 1 | 0 | 0 | 0.3 | 0.3 |
| 0 | 1 | 0 | 1 | 0 | 1 | 0.4 | 0.4 |
| 0 | 1 | 1 | 1 | 0 | 0 | 0.0 | 0.0 |
| 0 | 1 | 1 | 1 | 0 | 1 | 0.1 | 0.1 |
| 0 | 1 | 2 | 1 | 0 | 0 | 0.3 | 0.8 |
| 0 | 1 | 2 | 1 | 0 | 1 | 0.2 | 0.2 |

| PARENT ELEMENT NUMBER i1 | CHARACTER STRING NUMBER j1 | WORD CANDIDATE NUMBER k1 | CHILD ELEMENT NUMBER i2 | CHARACTER STRING NUMBER j2 | WORD CANDIDATE NUMBER k2 | TRANSITION PROBABILITY p4 | NORMALIZED TRANSITION PROBABILITY p4' |
|---|---|---|---|---|---|---|---|
| 1 | 0 | 0 | 3 | 0 | 0 | 0.00 | 0.00 |
| 1 | 0 | 0 | 3 | 0 | 1 | 0.00 | 0.00 |
| 1 | 0 | 0 | 3 | 0 | 2 | 0.00 | 0.00 |
| 1 | 0 | 0 | 3 | 0 | 3 | 0.30 | 0.2 |
| 1 | 0 | 0 | 3 | 0 | 4 | 0.30 | 0.1 |
| 1 | 0 | 0 | 3 | 0 | 5 | 0.1 | 0.1 |
| 1 | 0 | 0 | 3 | 0 | 0 | 0.3 | 0.0 |
| 1 | 0 | 0 | 3 | 0 | 1 | 0.2 | 0.08 |
| 1 | 0 | 0 | 3 | 0 | 2 | 0.0 | 0.06 |
| 1 | 0 | 0 | 3 | 0 | 3 | 0.1 | 0.09 |
| 1 | 0 | 0 | 3 | 0 | 4 | 0.3 | 0.06 |
| 1 | 0 | 0 | 3 | 0 | 5 | 0.1 | 0.1 |

| ELEMENT NUMBER i | CHARACTER STRING NUMBER j | WORD CANDIDATE NUMBER k | EXTRACTED CHARACTER STRING | NUMBER OF CHAR- ACTERS | CHAR- ACTER NUMBER | NORMALIZED APPEARANCE PROBABILITY p3' | POSTERIOR PROBABILITY pp1 |
|---|---|---|---|---|---|---|---|
| 0 | 1 | 0 | FULL NAME | 2 | 0,1 | 0.67 | 0.946 |
| 0 | 1 | 1 | (FIRST NAME) | 1 | 15 | 0.33 | 0.054 |
| 0 | 1 | 2 | NULL | | | 0.0 | 0.0 |
| 1 | 0 | 0 | (FAMILY NAME) | 1 | 12 | 0.6 | 0.51 |
| 1 | 0 | 1 | NULL | | | 0.4 | 0.49 |
| 3 | 0 | 0 | FULL NAME | 1 | 0,1 | 0.18 | 0.0 |
| 3 | 0 | 1 | フジ | 2 | 6,7 | 0.18 | 0.12 |
| 3 | 0 | 2 | タロウ | 3 | 8,9,10 | 0.18 | 0.09 |
| 3 | 0 | 3 | 富士 | 2 | 17,18 | 0.18 | 0.41 |
| 3 | 0 | 4 | 太郎 | 2 | 19,20 | 0.18 | 0.22 |
| 3 | 0 | 5 | NULL | | | 0.1 | 0.15 |

FIG.37

| ELEMENT NUMBER i | CHARACTER STRING NUMBER j | WORD CANDIDATE NUMBER k | EXTRACTED CHARACTER STRING | NUMBER OF CHAR-ACTERS | CHAR-ACTER NUMBER | NORMALIZED EMISSION PROBABILITY p3' | POSTERIOR PROBABILITY pp1 |
|---|---|---|---|---|---|---|---|
| 0 | 1 | 0 | FULL NAME (FIRST NAME) | 2 | 0,1 | 0.3 | 1.0 |
| 0 | 1 | 1 | NULL | | | 0.0 | 0.0 |
| 0 | 1 | 2 | | 1 | 15 | 0.0 | 0.0 |
| 1 | 0 | 0 | (FAMILY NAME) | 1 | 12 | 0.6 | 0.51 |
| 1 | 0 | 1 | NULL | | | 0.4 | 0.49 |
| 3 | 0 | 0 | FULL NAME | 1 | 0,1 | 0.18 | 0.0 |
| 3 | 0 | 1 | フジ | 2 | 6,7 | 0.18 | 0.12 |
| 3 | 0 | 2 | タロウ | 3 | 8,9,10 | 0.18 | 0.09 |
| 3 | 0 | 3 | 富士 | 2 | 17,18 | 0.18 | 0.41 |
| 3 | 0 | 4 | 太郎 | 2 | 19,20 | 0.18 | 0.22 |
| 3 | 0 | 5 | NULL | | | 0.1 | 0.15 |

FORM PROCESSING METHOD, FORM PROCESSING DEVICE, AND COMPUTER PRODUCT

CROSS-REFERENCE TO RELATED APPLICATIONS

This application is based upon and claims the benefit of priority from the prior Japanese Patent Application No. 2006-209065, filed on Jul. 31, 2006, the entire contents of which are incorporated herein by reference.

BACKGROUND OF THE INVENTION

1. Field of the Invention

The present invention relates to a technology for processing form documents in an electronic non-structured document format.

2. Description of the Related Art

Conventionally, automatic input of data included in a form of a paper document has been developed. For fixed-form documents, a layout definition format is prepared in advance, and the character recognition is performed at reading positions on the paper document to input data.

If a layout of a form to be processed is unknown, however, due to tremendous cost required to prepare layout definition formats, generally, manual search and input for data corresponding to a heading is performed. Thus, high human cost is required. Especially, form documents sent from outside companies, such as statements of delivery and quotations, it is difficult to specify the layout, thereby raising cost in computerization.

Same problem occurs in form documents of non-structured document created with Microsoft Word or Microsoft Excel. The process of copying and pasting must be done by human to input data.

As described above, it is difficult to recognize and extract desired data from a paper form document in which no layout information is provided, or a form document in an electronic non-structured document format. Therefore, automatic recognition and extraction for such documents has been demanded (for example, IEEE Trans. on Pattern analysis and Machine Intelligence, vol. 17, no. 5, pp. 432-445, 1995, titled "Layout Recognition of Multi-Kinds of Table Form Documents" by T. Watanabe et al.). There is a technique of logical structure recognition for non-fixed form documents. For example, in a technique disclosed in Japanese Patent Application Laid-Open Publication No. 2005-275830, data corresponding to a heading is searched based on cell information of a table, without using a headings dictionary.

However, cell configuration is diverse, and when a heading and data are present within a cell, the above technique cannot be applied. Furthermore, when the cell information is erroneous, a wrong relationship between the heading and the data is formed according to such error.

In view of these problems, a method of extracting data corresponding to the headings that have been given beforehand is widely used in recent years. In this method, a character string corresponding to the headings dictionary is first extracted, and then, data corresponding to the character string is extracted. In the method disclosed in Japanese Patent Application Laid-Open Publication No. 2005-275830, even when subheadings are present under headings and data is present also under such subheadings, recognition of data is possible regardless of an order of the subheadings. In the method disclosed in Proc. ICDAR, pp. 458-462, 2005, titled "Universal Data Capture Technology from Semi-structured Forms", by Diar Tuganbaev et al., a heading is extracted and data corresponding to the heading is extracted.

However, in the method disclosed in Japanese Patent Application Laid-Open Publication No. 2005-275830, while the flexibility for layouts becomes very high, the system can not be applied when subheadings are omitted and can only be applied to the form documents with headings. As a result, while the flexibility for layouts is high, restrictions against character strings are large. Therefore, applicable form documents are limited, thereby having low versatility.

Moreover, in the method disclosed in Proc. ICDAR, pp. 458-462, 2005, sub headings are extracted from headings, and finally corresponding data is recognized. However, a number of similar headings are present within a form document and once a subheading is erroneously recognized, all recognition performed after the erroneous recognition of the subheading results in error.

As described above, the conventional systems of recognizing logical structure from non-fixed form documents have low convenience since, faint line information or cell information is not used in the processing of information within a table, or the right justification in a cell can not be handled. For this reason, these systems are not appropriate as a method of searching for data corresponding to headings or for subheadings corresponding to headings. Furthermore, if cell information is used, processing in response to a variety of combinations of cells is required, and combinations of cells are limited to positional arrangement of the headings.

Moreover, recognition is made on character string information on the assumption that all hierarchies exist.

Since recognition is made from a higher level hierarchy corresponding to a heading, in form documents having a high level hierarchy, the accuracy is degraded as the processing reaches a low level hierarchy such as subheadings and data. Once erroneous recognition is made for a heading of low accuracy, all recognition processing performed thereafter results in error following the erroneous recognition.

Due to dependence on data, these systems can not respond to the case of different element of logical structure even though the headings are the same. As a problem that appears when considering many logical elements and that is a subject of discussion, especially when headings to be recognized increase in number, or when hierarchies of the headings increase, the same character strings increase in character strings of the headings. Accordingly, it becomes important to distinguish a character string corresponding to a desired heading from more than one heading of the same character string, and to perform the consistency processing on recognized results.

In the above conventional technologies, the overall consistency processing of form documents is insufficient.

SUMMARY OF THE INVENTION

It is an object of the present invention to at least solve problems in the above conventional technologies.

A recording-medium according to one aspect of the present invention stores therein a form processing program that causes a computer to recognize a logical structure in a form document, using a database storing data on a hierarchical logical structure of logical elements that logically make up the form document, appearance frequency of a character string to be the logical elements, and frequency regarding relative position between the logical elements on the form document. The form processing program causes the computer to execute extracting a character string as a word candidate from among character strings in the form document based on correspondence with the character strings to be the logical elements stored in the database; calculating an emission probability of the word candidate appearing as a logical element based on the appearance frequency; calculating a transition probability that is a probability of a word candidate of one logical element and a word candidate of another logical element appearing in combination, based on the frequency regarding relative position; and calculating credibility that the word candidate of the logical element is a character string corresponding to the logical element, based on the emission probability and the transition probability.

A form processing device according to another aspect of the present invention recognizes a logical structure in a form document, using a database storing data on a hierarchical logical structure of logical elements that logically make up the form document, appearance frequency of a character string to be the logical elements, and frequency regarding relative position between the logical elements on the form document. The form processing apparatus includes an extracting unit that extracts a character string as a word candidate from among character strings in the form document based on correspondence with the character strings to be the logical elements stored in the database; an emission probability calculating unit that calculates an emission probability of the word candidate appearing as a logical element based on the appearance frequency; a transition probability calculating unit that calculates a transition probability that is a probability of a word candidate of one logical element and a word candidate of another logical element appearing in combination, based on the frequency regarding relative position; and a credibility calculating unit that calculates credibility that the word candidate of the logical element is a character string corresponding to the logical element, based on the emission probability and the transition probability.

A form processing method according to still another aspect of the present invention is of recognizing a logical structure in a form document, using a database storing data on a hierarchical logical structure of logical elements that logically make up the form document, appearance frequency of a character string to be the logical elements, and frequency regarding relative position between the logical elements on the form document. The form processing method includes extracting a character string as a word candidate from among character strings in the form document based on correspondence with the character strings to be the logical elements stored in the database; calculating an emission probability of the word candidate appearing as a logical element based on the appearance frequency; calculating a transition probability that is a probability of a word candidate of one logical element and a word candidate of another logical element appearing in combination, based on the frequency regarding relative position; and calculating credibility that the word candidate of the logical element is a character string corresponding to the logical element, based on the emission probability and the transition probability.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a schematic of a form document 200 that is to be processed by the form processing apparatus;

FIG. 3 is a schematic illustrating boxes in the form document 200 shown in FIG. 2;

FIG. 4 is an explanatory diagram of a character number assigned to each character in the form document 200 shown in FIG. 2;

FIG. 5 is an explanatory diagram of layout information of the form document 200 shown in FIG. 2;

FIG. 6 is an explanatory diagram of character information of the form document 200 shown in FIG. 2;

FIG. 7 is a schematic of a generic logical structure table;

FIG. 8 is a schematic of a character string information table;

FIG. 9 is a schematic of a connection information table 900;

FIG. 17 is a schematic of a word candidate table output by the frequency digitizing unit 1302;

FIG. 18 is a schematic for illustrating normalized emission probability $p3'(i, j, k)$ of a word candidate Wk for each element Ei;

FIG. 20 is a schematic of a connection candidate table showing connection relationship between a parent element Ei1=E0 and a child element Ei2=E1;

FIG. 22 is a schematic of a connection candidate table of connection relationship between a parent element Ei1=E1 and a child element Ei2=E2;

FIG. 26 is a schematic of a third word candidate table obtained by an evaluating unit 1304;

FIG. 37 is a schematic of a fourth word candidate table after forcible conversion of emission probability p3';

DETAILED DESCRIPTION OF THE PREFERRED EMBODIMENTS

Exemplary embodiments according to the present invention will be explained in detail below with reference to the accompanying drawings.

Figure 1:
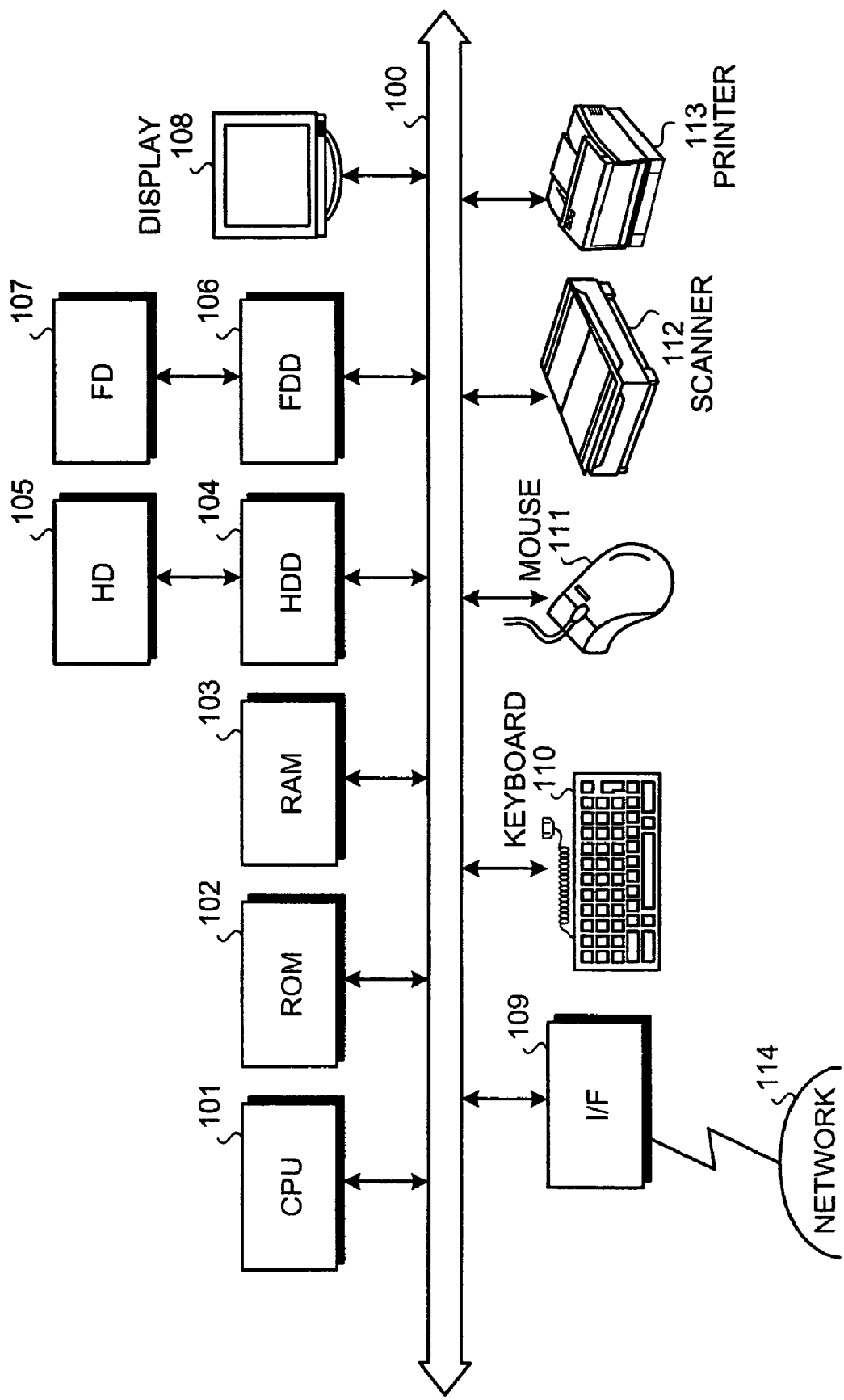
FIG. 1 is a schematic of a form processing apparatus according to an embodiment of the present invention.

FIG. 1 is a schematic of a form processing apparatus according to an embodiment of the present invention. The form processing apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107 as an example of a removable recording medium, a display 108, an interface (I/F) 109, a keyboard 110, a mouse 111, a scanner 112, and a printer 113. Component units are connected through a bus 100.

The CPU 101 controls the entire form processing apparatus. The ROM 102 stores programs such as boot program. The RAM 103 is used as a work area of the CPU 101. The HDD 104, under control of the CPU 101, controls reading or writing of data from or to the HD 105. The HD 105 stores the data written under control of the HDD 104.

The FDD 106, under control of the CPU 101, controls reading or writing of data from or to the FD 107. The FD 107 stores the data written under control of the FDD 106 and has the data stored on the FD 107 read by the form processing apparatus.

A removal recording medium, besides the FD 107, may be a compact-disc read-only memory (CD-ROM), compact-disc recordable (CD-R), a compact-disc rewritable (CD-RW), a magneto optical (MO) disk, a digital versatile disk (DVD), or a memory card. The display 108 displays data such as a cursor, an icon, a tool box, a document, an image, and function information. As the display 108, for example, a cathode ray tube (CRT), a thin film transistor (TFT) liquid crystal display, or a plasma display panel may be employed.

The I/F 109 is connected to a network 114 such as Internet through a telecommunication line and is connected to other apparatuses through the network 114. The I/F 109 serves as an interface between the network 114 and the inside of the apparatus, and controls input and output of data from and to external apparatuses. As the I/F 109, for example, a modem or a local area network (LAN) adapter may be employed.

The keyboard 110 includes keys for inputting characters, numerals, and various instructions, and is used to input data. The keyboard 110 may be a touch-panel input pad or a numeric key pad. The mouse 111 performs the cursor movement, range selection, movement or size change of window. The mouse 111 may be a trackball or joystick having similar functions as a pointing device.

The scanner 112 optically reads an image, and captures in the image data into the form processing apparatus. The scanner 112 may have an optical character recognition (OCR) function. The printer 113 prints image data and document data. As the printer 113, a laser printer or an ink jet printer may be employed.

FIG. 2 is a schematic of the form document that is processed by the form processing apparatus. A form document 200 is composed of a plurality of cells (three cells in the example of FIG. 2) C1 to C3. The form document 200 contains data on name of a person.

In the explanation below, all data in Japanese characters contained in the form document is expressed by italicized letters. Further, with regard to this data, pronunciation of the name is represented by lower case letters. As shown in FIG. 2, character information of "FULL NAME" appears in cell C1, "FURIGANA" which means pronunciation, "fuji", and "tarou" in cell C2, and "(FAMILY NAME)", "(FIRST NAME)", "FUJI", and "TAROU" in cell C3. For explanation's sake, pronunciation of the Japanese characters is shown in brackets beside each Japanese character in figures.

When this form document 200 is image data read from a paper form document, character information in cells C1 to C3 and layout information of cells C1 to C3 can be recognized at the time the form document 200 is taken in as image data. When the form document 200 is a non-structured electronic document (electronic form document) created with a word processing software or spreadsheet software, character information in cells C1 to C3 and layout information of cells C1 to C3 can be extracted from the electronic form document. Various methods are known as techniques to achieve this extraction, and an arbitrary technique can be used.

FIG. 3 is a schematic illustrating boxes in the form document 200. Each of cells C1 to C3 is divided into boxes. Reference characters "a" to "f" are assigned to the boxes in a vertical direction and reference numerals of "1" to "4" in a horizontal direction. With the combination (box number) of the reference characters and the reference numerals, boxes are identified. For example, in a box a2, the character information of "FURIGANA" is shown. A character number is uniquely assigned to each character included in character strings contained in the form document 200.

FIG. 4 is an explanatory diagram of a character number assigned to each character in the form document 200. Each of character numbers 0 to 20 is assigned to each character in the form document 200.

FIG. 5 is an explanatory diagram of layout information of the form document 200. Layout information 500 is the information to identify the layout of the form document 200 expressed by lines and polygons, and the identification is made by use of the boxes sown in FIG. 3. For example, the layout information 500 includes the box numbers making up each cell, the number of vertexes of the cell, coordinates of the vertexes. For example, the cell C1 is composed of the boxes a1, b1, c1, d1, e1, and f1. The number of vertexes of the cell C1 is four.

FIG. 6 is an explanatory diagram of character information of the form document 200. Character information 600 is the information to identify characters in the form document 200, and the identification is made by use of character numbers shown in FIG. 4. For example, the character information 600 includes a character code to identify the character, the cell number of the cell in which the character is included, the coordinates of the character itself, font, and size. For example, character code of character number 0 is "FULL" in the cell C1, and font is Gothic and size is 11.

A generic logical structure data base (DB) stores a generic logical structure that is common among the form document 200 on which a logical structuring process is to be performed. Specifically, logical elements (hereinafter, "element"), which are also called tag, when the form document is formed in hierarchical structure, and meaning thereof, character strings in which these elements are specifically expressed on the form document, and relationship between elements. The generic logical structure DB includes a generic logical structure table, a character string information table, and a connection information table.

FIG. 7 is a schematic of the generic logical structure table. The generic logical structure table 700 includes information, for each element, on an element number, a representative character string, an attribute, a corresponding character string, and a parent element number. The element number is a unique number to identify the representative character string. The element of element number i (i is a number) is referred to as element Ei. The representative character string is a character string often used in the form document 200.

The attribute represents a nature or characteristic of the representative character string. The attribute includes a heading element and a data element. The heading element is a fixed character string that identifies the item of a cell (for example, "FULL NAME" shown in FIG. 2). The data element is a character string to be input into a cell (for example, "FUJI" shown in FIG. 2).

The corresponding character string is a character string that can be handled as a character string of an element. Specifically, the same character string (for example, "FAMILY NAME") as the representative character string and a character string (for example, "LAST NAME") having a similar meaning to that of the representative character string are the corresponding character strings. A character string having the similar meaning but expressed differently depending on form documents are retained as a character string similar to the representative character string.

In other words, a character string representatively selected from among corresponding character strings is the representative character string. When character strings can not be limited as in a case of the element "family name data", character strings may be given by limiting types of characters by a wild card "*". The parent element number represents an element number of an element at a superior to a current element. The uppermost element 0 has no element superior to itself and a parent element number thereof is "NULL".

FIG. 8 is a schematic of the character string information table. A character string information table 800 stores information on frequency of appearance $p1(i, j)$ of corresponding character strings for each element. Character string number j is the number given to corresponding character strings in the element Ei, and is a serial number starting with 0. Incidentally, the corresponding character string for character string number j in the element Ei is expressed as "corresponding character string Mij".

The frequency of appearance $p1(i, j)$ indicates the appearance ratio of the corresponding character string Mij appearing as the element Ei. For example, for the representative character string "FULL NAME" of the element E0, two corresponding character strings, "NAME" of character string number 0 and "FULL NAME" of character string number 1 are present. If the frequency of appearance $p1(i, j)$ by learning is $p1(0, 0)=30\%$ for "NAME" and $p1(0, 1)=70\%$ for "FULL NAME", these rates are described as "0.3" and "0.7", respectively. This represents the frequency of appearance of a true element itself and indicates the tendency of appearance of a character string. Incidentally, if it is desired that all character strings appear at the same probability, then same values are stored.

If there is a case in which a character string is omitted, then the corresponding character string Mij must be specified as "NULL" and the frequency of appearance thereof must be specified. For the representative character string "FULL NAME" of the element E0, the frequency of appearance $p1(0, 2)$ of "NULL" to which the character string number 2 is assigned is $p1(0, 2)=0\%$. Such corresponding character string Mij thus omitted is referred to as "NULL character string".

FIG. 9 is a schematic of the connection information table. A connection information table 900 indicates a relative positional relationship between a pair of elements. An element number pair is a combination of element numbers indicative of two elements of which cells are adjacent to each other.

Relative positional information is expressed in terms of a horizontal distance and a vertical distance between elements. Based on a cell that contains a character string identified by one element of an element number pair, the horizontal distance is the number of cells, in a horizontal direction, from such cell to the cell that contains the character string identified by the other element of the element number pair. For example, when a left element of an element number pair is taken as one element serving as the base, a left to right direction represents a positive distance and a right to left direction represents a negative distance.

Likewise, based on a cell that contains a character string identified by one element of an element number pair, the vertical distance is the number of cells, in a vertical direction, from such cell to the cell that contains the character string identified by the other element of the element number pair. For example, when a left element of an element number pair is taken as one element serving as the base, an upward direction represents negative distance and a downward direction represents positive distance.

The frequency indicates, for each element number pair, the rate of occurrence of the combination of the horizontal distance and the vertical distance. Since the element E1 has a NULL character string of 0.4 (40%), the total frequency of (a) to (f) shown in FIG. 9 is 0.6 (60%). As seen, the connection information table 900 indicates the distribution regarding the location of presence of child elements as seen from parent elements.

Figure 10:
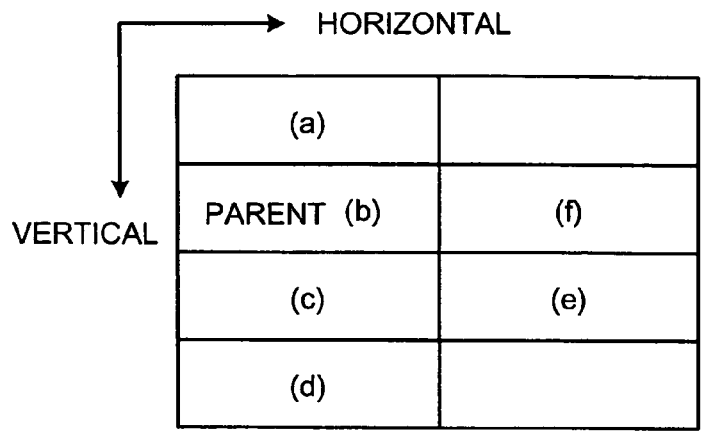
FIG. 10 is a schematic for explaining expansion of the connection information table 900.

FIG. 10 is a schematic for explaining expansion of the connection information table 900. Suppose a parent element is E0 and a child element is E1. If the parent element E0 is contained in the cell indicated by the frequency (b), then the child element E1 is contained in cells indicated by frequency (a) to (f), at their respective frequencies. Therefore, by the element pair, relative location of both elements is specified. By this relative location, the location of child elements can be limited. In the calculation of the number of cells in the horizontal distance and vertical distance described above, the number of cells counted may differ depending on the route.

Figure 11:
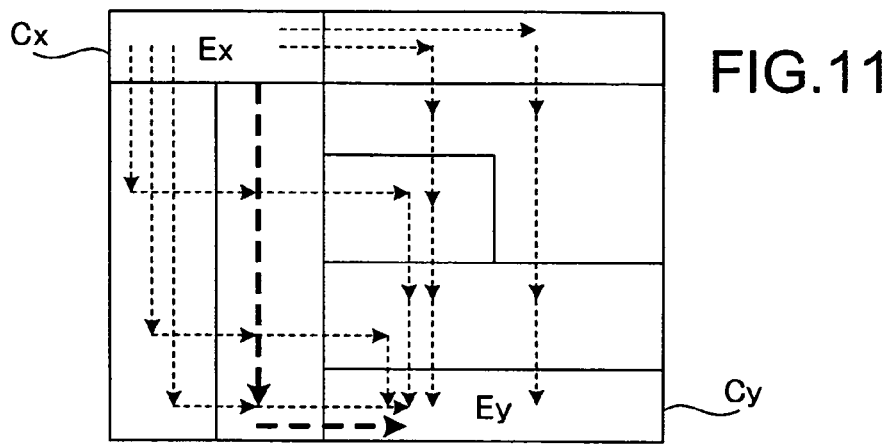
FIG. 11 is a schematic for explaining calculation of the number of cells.

FIG. 11 is a schematic for explaining calculation of the number of cells. Rectangles represent cells. The route from the cell Cx containing the element Ex to the cell Cy containing the element Ey is shown by an arrowed dotted line. The number of cells to be counted shall be the minimum value of the number of times cell border is crossed. In FIG. 11, since the route indicated by a thick arrowed dotted line has the lowest times (twice) of border crossing, the description of "(horizontal distance, vertical distance)=(1, 1)" is entered on the connection information table 900.

Figure 12:
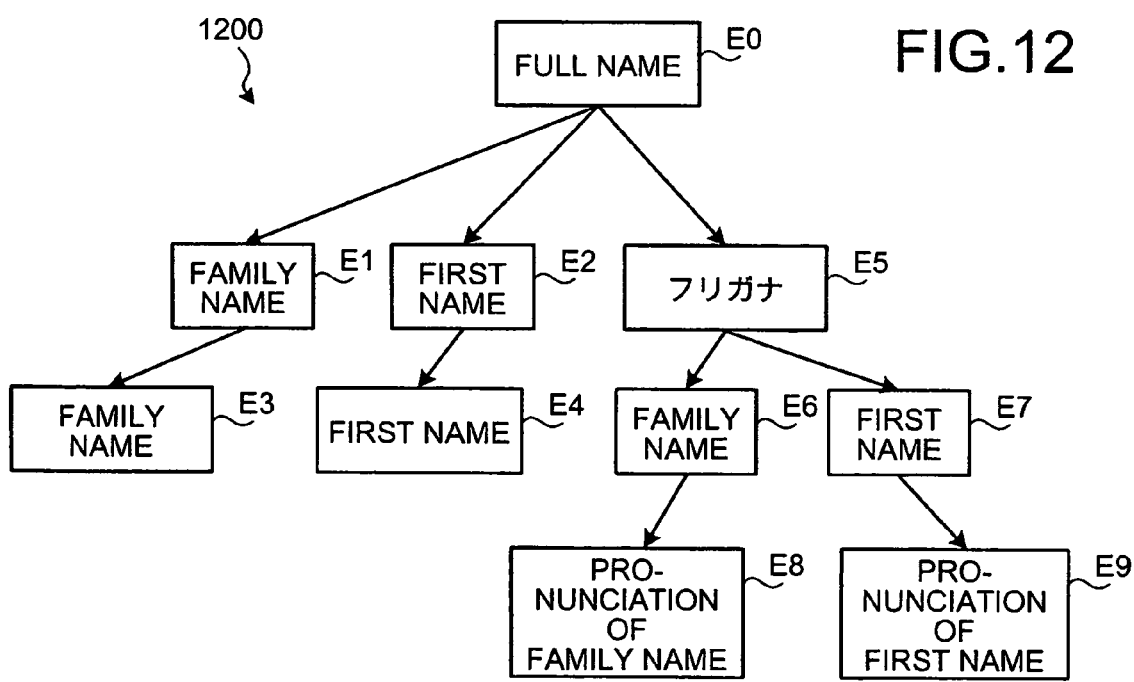
FIG. 12 is a schematic for illustrating relationship between elements of the generic logical structure in a tree structure.

FIG. 12 is a schematic for illustrating relationship between elements having the generic logical structure, in a tree structure. A tree structure 1200 is configured on the basis of a correlation of element numbers and parent element numbers in the generic logical structure table 700 shown in FIG. 7. In the tree structure 1200, a big heading is arranged at an upper layer, and a subheading is arranged at lower layers. At the lowest layer, data is present. Arrows shown in FIG. 12 indicate element number pairs shown in FIG. 9.

Figure 13:
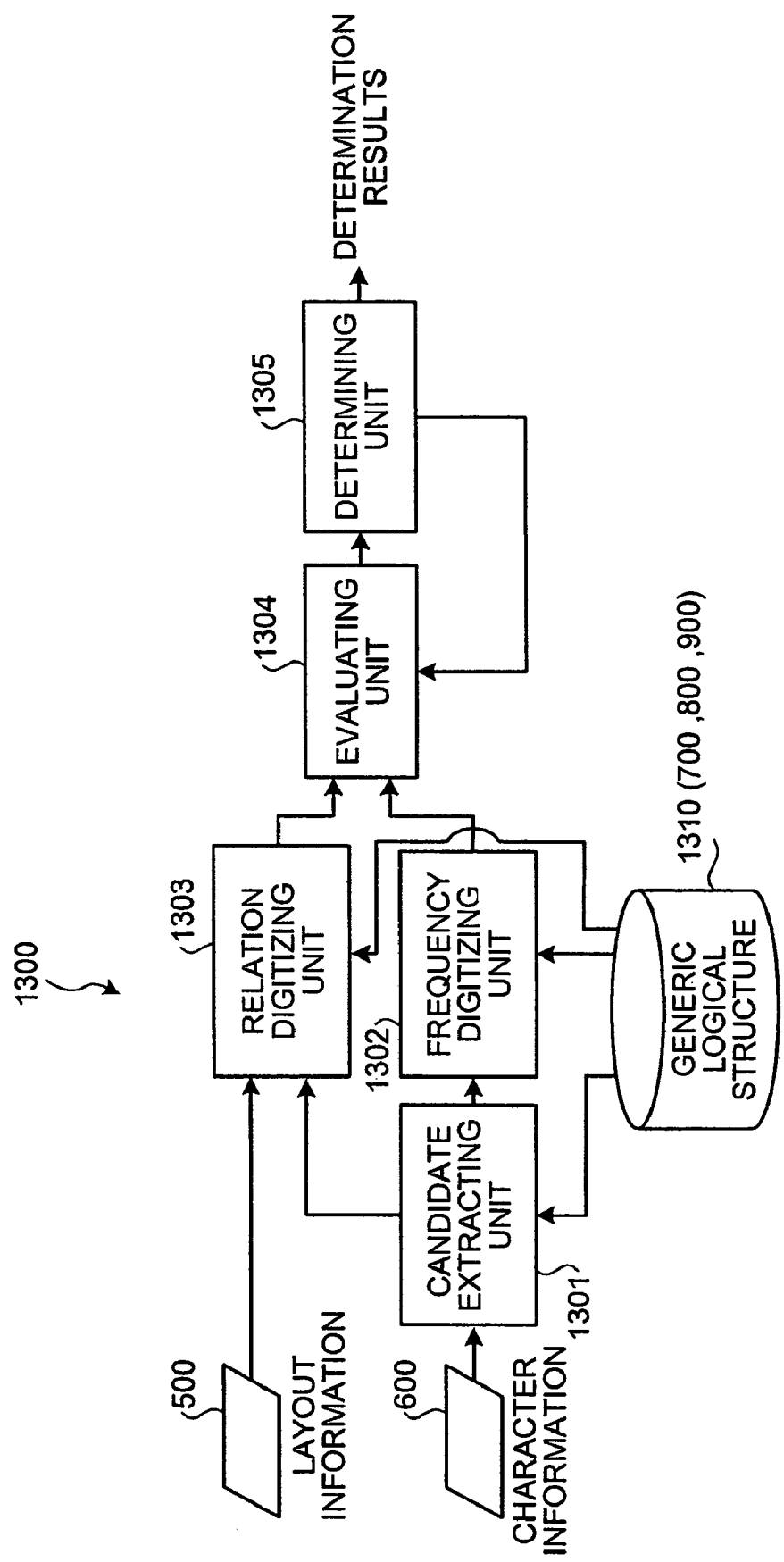
FIG. 13 is a block diagram of the form processing apparatus according.

FIG. 13 is a block diagram of the form processing apparatus. A form processing apparatus 1300 includes the generic logical structure DB 1310, a candidate extracting unit 1301, a frequency digitizing unit 1302, a relation digitizing unit 1303, an evaluating unit 1304, and a determining unit 1305. The generic logical structure DB 1310 includes the generic logical structure table 700 (see FIG. 7), the character string information table 800 (see FIG. 8), and the connection information table 900 (see FIG. 9).

The form processing apparatus 1300 extracts the layout information 500 and the character information 600 from the form document 200 in advance. The candidate extracting unit 1301 has a function of extracting word candidates from the character information 600. The frequency digitizing unit 1302 has a function of calculating the frequency of appearance (emission probability) from each element of word candidates. The relation digitizing unit 1303 has a function of giving the rate of meaningful relation between word candidates (transition probability).

The evaluating unit 1304 has a function of calculating the rate of appearance of word candidates from their respective logical elements (evaluation value; specifically, posterior probability). The determining unit 1305 has a function of determining the elements and word candidates thereof as elements and character strings thereof in the form document 200, based on the evaluation value.

The generic logical structure DB 1310 realizes its function by, for example, the recording medium such as the ROM 102, the RAM 103, and the HD 105 shown in FIG. 1. The candidate extracting unit 1301, the frequency digitizing unit 1302, the relation digitizing unit 1303, the evaluating unit 1304, and the determining unit 1305 realize functions thereof by, for example, causing the CPU 101 to execute the programs recorded on the recording medium such as ROM 102, the RAM 103, and the HD 105 shown in FIG. 1, or by the I/F 109.

Figures 14, 15:
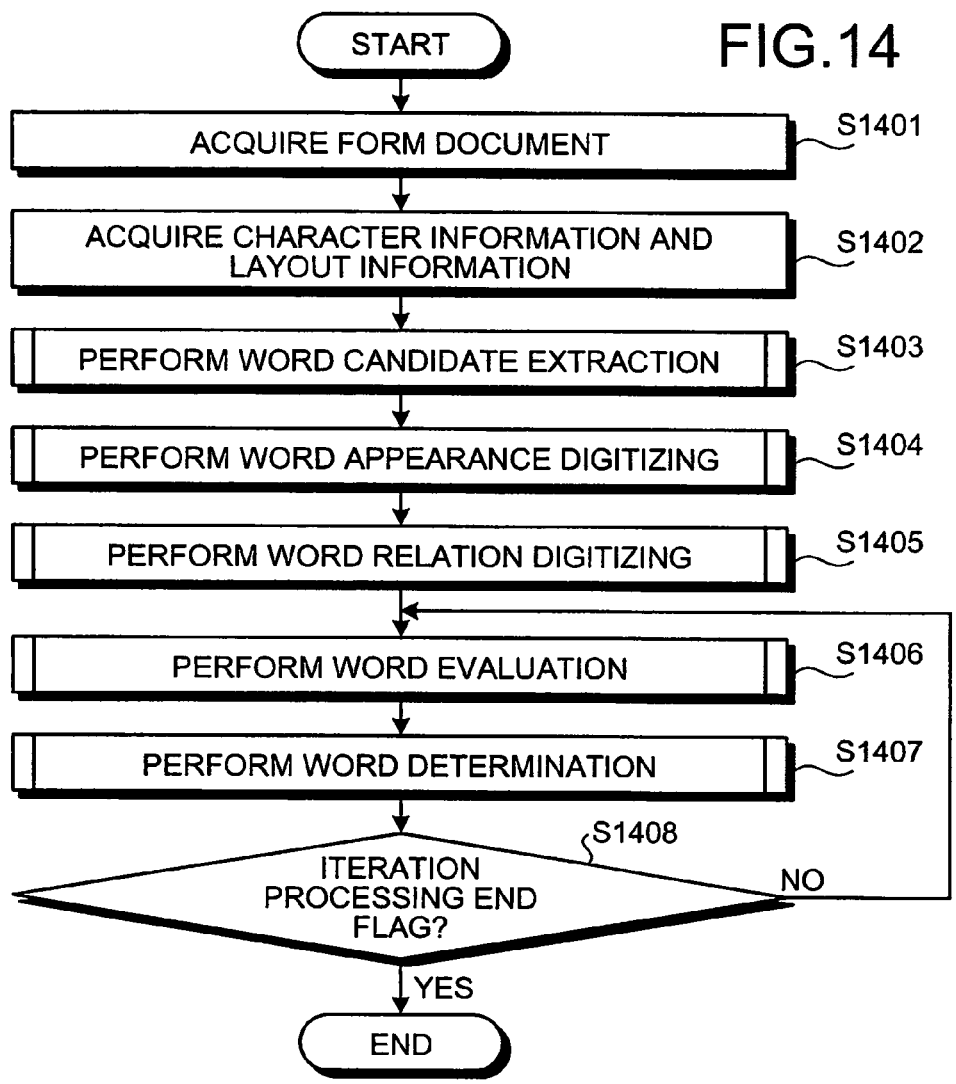
FIG. 14 is a flowchart of a form processing procedure by the form processing apparatus.
FIG. 15 is a schematic of a word candidate table.

FIG. 14 is a flowchart of a form processing procedure by the form processing apparatus. First the form document 200 is acquired (step S1401). This may be achieved, for example, by image reading of a paper form document or by inputting a non-structured electronic document prepared with spreadsheet software. Then, the layout information and the character information are acquired from the form document 200 (step S1402).

Thereafter, a word candidate extraction by the word extraction unit 1301 (step S1403), a word appearance digitizing process by the frequency digitizing unit 1302 (step S1404), a relation digitizing process by the relation digitizing unit 1303 (step S1405), a word evaluation process by the evaluating unit 1304 (step S1406), and a word determination process by the determining unit 1305 (step S1407) are sequentially performed.

Then, it is judged whether a repetition-processing end flag=1 (step S1408), and if the repetition-processing end flag=1 is not satisfied (step S1408: NO), he procedure goes back to step S1406. On the other hand, if the repetition-processing end flag=1 is satisfied (step S1408: YES), then a series of processing is finished.

The candidate extracting unit 1301 extracts, based on the character string information table 800, all character strings appearing to correspond to each element Ei as word candidates, and outputs a word candidate table.

Specifically, character strings are extracted by referring to coordinates of each character in the character information 600. For example, the character string "FURIGANA" of the form document 200 is the combination of characters "FU", "RI", "GA", and "NA", and when vertical coordinate values of these characters are about the same and horizontal coordinate values of these characters are arranged at almost same intervals, these characters are extracted as one word of "FURIGANA". Such character string extracted from the character information 600 is called "extracted character string".

FIG. 15 is a schematic of the word candidate table. The word candidate table 1500 shows a relationship between the elements and the extracted character strings. Specifically, the word candidate table 1500 includes the element number i, the character string number j, a word candidate number k, the extracted character string, the number of characters, and the character number. The word candidate number k is a number given to the extracted character string that is determined as a word candidate as a result of comparison with a corresponding character string of the element number i and of the character string number j. The word candidate number k is a serial number starting from 0. The number of characters is the number of characters included in an extracted character string.

The candidate extracting unit 1301 reads out the corresponding character string Mij from the character string information table 800 (see FIG. 8), using the element number i and the character string number j. For example, since the first line of the word candidate table 1500 has the element number 0 and the character string number 1, the corresponding character string M01 ("FULL NAME") of the element E0 is read out. The extracted character string "FULL NAME" completely corresponds with the read-out corresponding character string M01 ("FULL NAME") and therefore, the extracted character string "FULL NAME" is determined as a word candidate of the element E0. k=0 is assigned as the word candidate number k.

An extracted character string that partially corresponds with the corresponding character string "NAME" also becomes a word candidate of the element E0. For example, at the second line of the word candidate table 1500, the extracted character string "(FIRST NAME)" partially corresponds with the corresponding character string M01 ("FULL NAME") of the element M0 in respect of the character "NAME". Therefore, the extracted character string "(FIRST NAME)" is determined as a word candidate of the element E0. The k=1 is assigned as the word candidate number k.

As a result, in the word candidate table 1500, the extracted character strings "FULL NAME" and "(FIRST NAME)" are extracted as a word candidate of the corresponding character string M01 ("FULL NAME") of the element E0, the extracted character string "(FAMILY NAME)" is extracted as a word candidate of the corresponding character string M10 ("FAMILY NAME") of the element E1, the extracted character strings "FULL NAME" and "(FIRST NAME)" are extracted as a word candidate of the corresponding character string M20 of the element E2, and the extracted character strings "FULL NAME", "fuji", "tarou", "FUJI", "TAROU" are extracted as a word candidate of the corresponding character string M30 of the element E3. An extracted character string of the word candidate number k that is extracted as a word candidate in the element Ei is hereinafter referred to as "word candidate Wk".

Figure 16:
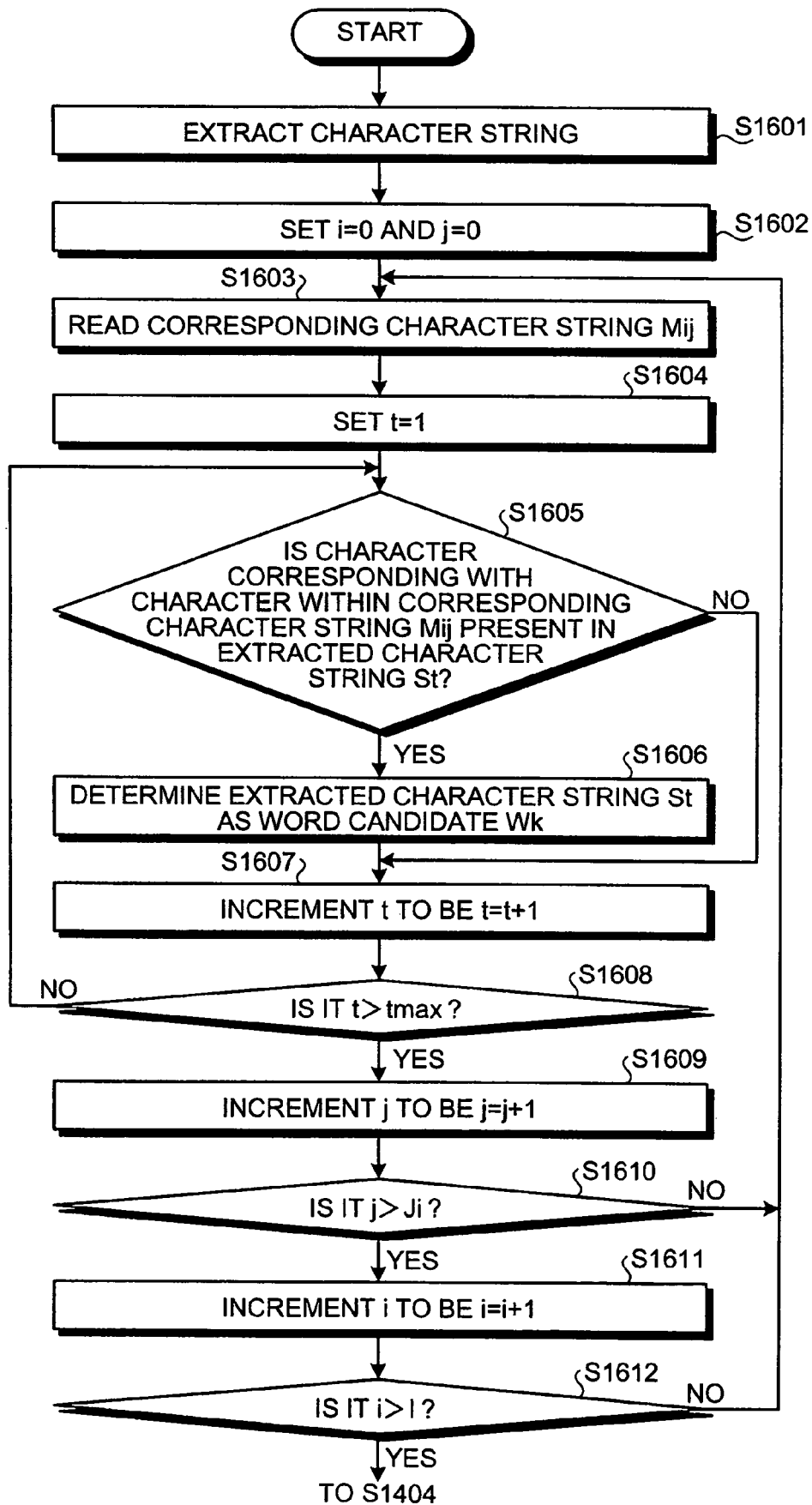
FIG. 16 is a flowchart of a word-candidate extracting process by a candidate extracting unit 1301 shown in FIG. 14.

FIG. 16 is a flowchart of a word-candidate extracting process by the candidate extracting unit 1301 shown in FIG. 14. All the character strings included in the form document 200 are extracted by using coordinate values of the character information 600 (step S1601). An extracted character string is expressed as extracted character string St. The extracted character string St is the t-th character string. "t" is referred to as a text number. The range of text number t is 1 to tmax. The tmax is the largest number of the extracted character string St.

Next, after setting the element number i=0, and the character string number j=0 (step S1602), the corresponding character string Mij is read out (step S1603). The text number is set to t=1 (step S1604). Then, it is judged whether a character corresponding with the character within the corresponding character string Mij is present in the extracted character string St (step S1605).

If such character is not present (step S1605: NO), the process proceeds to step S1607. On the other hand, if such character is present (step S1605: YES), the extracted character string St is determined as the word candidate Wk (step S1606) and the process proceeds to step S1607.

At step S1607, the extracted character string number is incremented. It is judged whether t>tmax is satisfied (step S1608). If t>tmax is not satisfied (step S1608: NO), the process goes back to step S1605. On the other hand, if t>tmax applies (step S1608: YES), then the character string number j is incremented (step 1609).

Then, it is judged whether j>Ji is satisfied (step S1610). Ji is the number of corresponding character strings in the element Ei. If j>Ji is not satisfied (step 1610: NO), the process returns back to step S1603. On the other hand, if j>Ji is satisfied (step 1610: YES), the element number i is incremented (step S1611).

Then, it is judged whether i>I is satisfied (step S1612). "I" is the number of elements in the element Ei. If i>I is not satisfied (step S1612: NO), then the process returns back to step S1603. On the other hand, if i>I is satisfied (step S1612: YES), the process proceeds to the word appearance digitizing process (step S1404). Thus, a sequence of word candidate extraction process is finished. As seen above, by the candidate extracting unit 1301, character strings in the form document 200 can automatically be extracted as word candidates.

In the frequency digitizing unit 1302, emission probability $p3(i, j, k)$ of each word candidate Wk is calculated, for all of the element Ei, the character string number j, and the word candidate Wk. First, combination of the element number i and the character string number j is read from the word candidate table 1500, and guided by such combination of the element number i and the character string number j, the emission probability $p1(i, j)$ of the corresponding character string is extracted from the character string information table 800.

Then, likeliness of the word candidate Wk is calculated based on a degree of matching (degree of correspondence) between a corresponding character string identified by the element number i and the character string number j and a word candidate Wk. Namely, if the number of characters of corresponding character string is expressed as m0, and the number of characters in which a corresponding character string and an extracted character sting are matched is expressed as m1, the observation probability $p2(i, j, k)$ indicative of the degree of matching is expressed by the following Equation 1.

$$p2(i,j,k)=m1/m0 \quad (1)$$

For example, at the first line of the word candidate table 1500, with respect to the corresponding character string "FULL NAME" (see FIG. 8) and the extracted character string "FULL NAME" of the element E0 as identified by the element number 0 and the character string number 1, since all characters ("FULL" and "NAME") of the corresponding character string M01 correspond with those of the extracted character string, two character strings out of two character strings correspond, hence p2(0, 1, 0)=100%. At the second line of the word candidate table 1500, since the extracted character string "(FIRST NAME)" corresponds with the corresponding character string "FULL NAME" of the element E0 in respect of the character string "NAME", one character string out of two character strings matches, hence p2(0, 1, 1)=50%.

Then, using the frequency of appearance $p1(i, j)$ and the observation probability $p2(i, j, k)$, the emission probability $p3(i, j, k)$ of each word candidate Wk is calculated by the following Equation 2.

$$p3(i,j,k)=p1(i,j) \times p2(i,j,k) \quad (2)$$

The frequency digitizing unit 1302 also adds to the word candidate table 1500 the emission probability $p3(i, j, k)$ of the NULL character string for all of the element Ei. In this case, since the total of the emission probability $P3(i, j, k)$ for each element Ei does not come to 1 (100%), the emission probability is normalized so that the total of the emission probability becomes 1. The normalized emission probability $P3(i, j, k)$ is expressed as a normalized emission probability $p3'(i, j, k)$. As seen above, the frequency digitizing unit 1302 outputs the word candidate table with new information (the emission probability $P3(i, j, k)$, normalized emission probability $p3'(i, j, k)$, etc.) added thereto.

FIG. 17 is a schematic of the word candidate table output by the frequency digitizing unit 1302. The word candidate table, obtained from the candidate extracting unit 1301, shown in FIG. 15 is hereinafter expressed as a "first word candidate table 1500" and the word candidate table, obtained from the frequency digitizing unit 1302, shown in FIG. 17 is hereinafter expressed as a "second word candidate table 1700".

FIG. 18 is a schematic for illustrating normalized emission probability $p3'(i, j, k)$ of the word candidate Wk for each element Ei. The thickness of a rectangular frame surrounding each extracted character string as a word candidate Wk indicates the height of normalized emission probability $p3'(i, j, k)$.

As a calculating method, the corresponding character string Mij of the element number i and of the character string number j has its emission probability $p1(i, j)$ stored in the generic logical structure DB 1310 and the emission probability $p1(i, j)$ is expressed by the following Equation 3.

$$p1(i,j)=p(T_i=e_{Tij}|C=e_{Ci}) \quad (3)$$

In the above Equation 3, C is a vector having the number of logical elements as its number of dimensions. T is a vector having the number of corresponding character strings Mij as its number of dimensions. e indicates a normalized orthogonal base and $e_i$ is the normalized orthogonal base indicative of the elements in which i-th element is 1 but others are 0, and is to be considered to express the element i.

When Mij is a hidden variable indicative of correct character string of each word candidate, the probability at which respective word candidates, when using this character string, are the word candidates as expressed on the form document is defined by the following Equation 2.

$$P(M_{ij}=e_{Mijk}|T_i=e_{Tij}) \quad (4)$$

The probability is deemed to be 1 for all word candidates Wk. As a notation here, P(X|Y) represents "probability of X when conditioned by Y"

The above observation probability p2($i, j, k$) is calculated from the following Equation 5 that is obtained by multiplying Equation 4.

$$p2(i,k,j) = P(O_{ijk}|M_{ij}=e_{Mijk})p(M_{ij}=e_{Mijk}|T_i=e_{Tij}) \quad (5)$$

The emission probability p3($i$, j, k) is calculated by multiplying Equation 3 by Equation 5. The emission probability p3($i, j, k$) is expressed by the following Equation 6.

$$\begin{aligned} p3(i, j, k) &= p(O_{ijk}, M_{ij} = e_{Mijk}, T_i = e_{Tij}|C = e_{ci}) \quad (6) \\ &= p(O_{ijk}|M_{ij} = e_{Mijk})p(M_{ij} = e_{Mijk}|T_i = e_{Tij}) \\ &\quad p(T_i = e_{Tij}|C = e_{ci}) \end{aligned}$$

In Equation 6, O indicates the word candidate itself extracted by the observation variable vector. The emission probability of NULL character string is read, as p3null(i), from the character string information table 800, and is directly treated as the normalized emission probability p3'($i, j, k$). As mentioned above, word candidates Wk other than the NULL character string may also be normalized.

Figure 19:
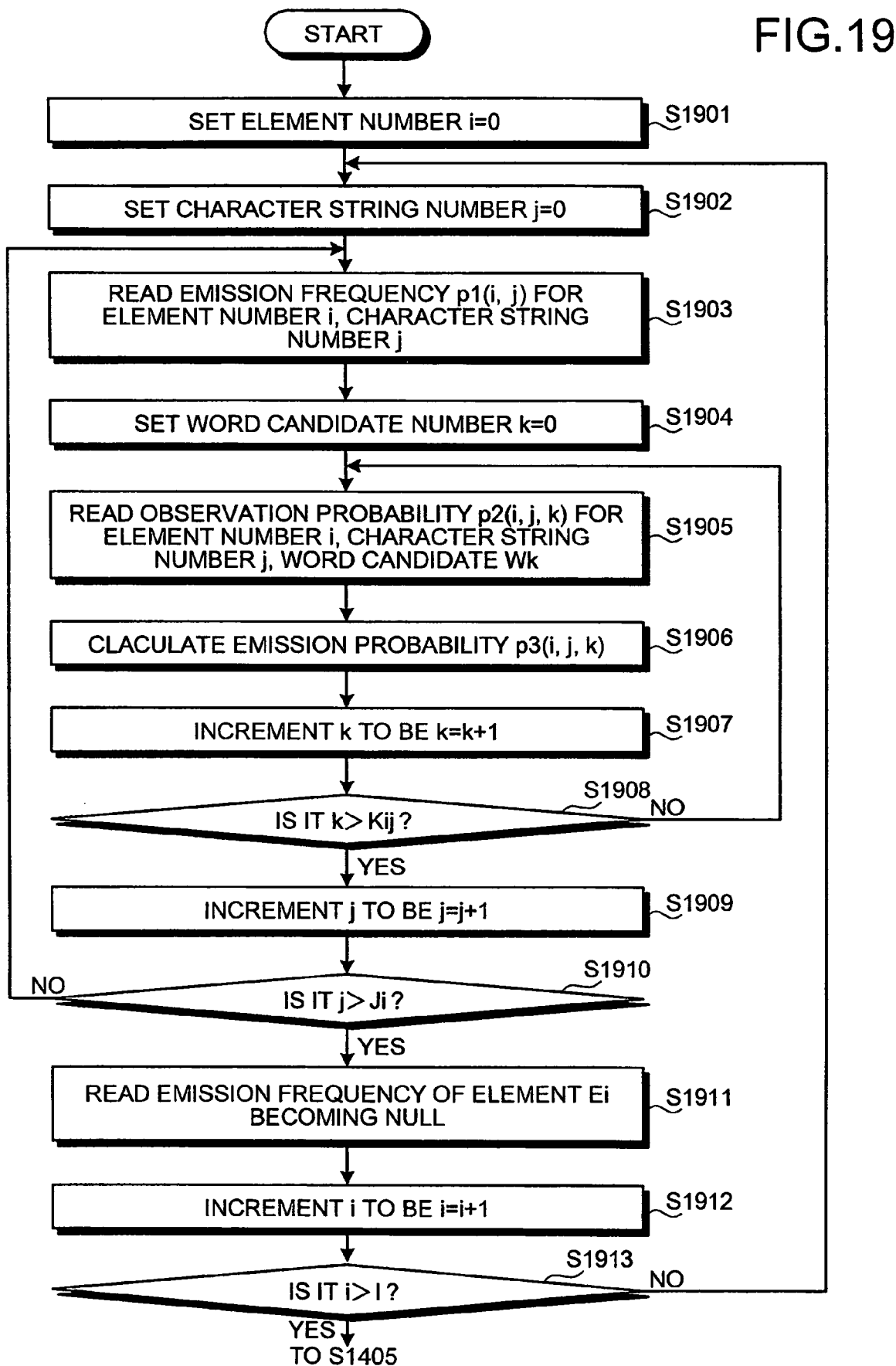
FIG. 19 is a flowchart of a frequency digitizing process, by the frequency digitizing unit 1302, shown in FIG. 14.

FIG. 19 is a flowchart of the frequency digitizing process by the frequency digitizing unit 1302. First, the element number i=0 is set (step S1901), and the character string number i=0 is set (step S1902). Next, the frequency of appearance p1($i, j$) for the element number i and character string number j is read from the character string information table 800 (step S1903).

Then, the word candidate number k=0 is set (step S1904), and the observation probability p2($i, j, k$) of the word candidate Wk at the element number i and the character string number j is calculated using Equation 1 (step S1905).

Thereafter, by multiplying the frequency of appearance p1($i, j$) by the observation probability p2($i, j, k$), the emission probability p3($i, j, k$) of the word candidate Wk at the element number i and the character string number j is calculated (step S1906). Then, the word candidate number k is incremented (step S1907). It is judged whether the word candidate number k satisfies k>Kij (step S1908). Kij is the number of word candidates for the element number i and the character string number j.

If k>Kij is not satisfied (step S1908: NO), the process returns back to step S1905. On the other hand, if k>Kij is satisfied (step S1908: YES), the character string number j is incremented (step S1909).

Then, it is judged whether j>Ji is satisfied (step S1910). Ji is the number of corresponding character strings in the element Ei. If j>Ji is not satisfied (step S1910: NO), the process returns back to step S1903. On the other hand, if j>Ji is satisfied (step S1910: YES), the frequency of appearance at which the element Ei becomes NULL, p3null (i), is read from the character string information table 800 (step S1911).

Then, the element number i is incremented (step S1912), and it is judged whether i>I is satisfied (step S1913). i is the number of elements for the element Ei. If i>I is not satisfied (step S1913: NO), the process returns back to step S1902. On the other hand, i>I is satisfied (step S1913: YES), the process proceeds to the relation digitizing process (step S1405). Thus, a series of the word appearance digitizing process is finished. As seen above, the frequency digitizing unit 1302 can digitize the frequency at which the word candidate Wk appears in the relevant element Ei.

Using the connection information table 900 shown in FIG. 9, the relation digitizing unit calculates the emission probability of a combination of arbitrarily selected word candidates in each element Ei, or the emission probability (conditional probability) of word candidates of a child element when a word candidate of a parent element is determined.

To be specific, with respect to two elements having connection, a higher element is named a parent element Ei1 (i1 is a numeral) and a lower element is named a child element Ei2 (i2 is a numeral, i2≠i1). From the two connected elements Ei1 and Ei2 having a parent-child relationship, the relation digitizing unit 1303 calculates the emission probability of the word candidate Wk (hereinafter, "word candidate Wki2") of the child element Ei2 when the word candidate Wk (hereinafter, "word candidate Wki1") of the parent element Ei1 is present. This emission probability can be calculated based on the number of cells counted shown in FIG. 11.

Specifically, a transition probability indicative of a relative positional relationship of the cells to which two word candidates Wki1 and Wki2 respectively belong is expressed as p4{$x, y$} (or simply p4). x is a relative position in a vertical direction (downward is positive and upward is negative) of the cell to which the child element Ei2 belongs when the position of the cell to which the parent element Ei1 belongs is used as a base, while y is a relative position in a horizontal direction (rightward is positive and leftward is negative) of the cell to which the child element Ei2 belongs when the position of the cell to which the parent element Ei1 belongs is used as a base.

For example, if two word candidates Wki1 and Wki2 are located in cells of the same height and the word candidate Wki2 of the child element Ei2 belongs to the cell that is located one cell to the right of the cell to which the word candidate Wki1 of the parent element Ei1 belongs, the transition probability is expressed as p4{0, 1}. The transition probability when these two word candidates are located within the same cell is expressed as p4{0, 0}. This transition probability p4{$x, y$} can be calculated from the frequency described in the connection information table 900. A connection candidate table will now be described that summarizes the results of processing by the relation digitizing unit 1303.

FIG. 20 is an explanatory diagram of the connection candidate table showing the connection relationship between the parent element Ei1=E0 and the child element Ei2=E1. In the connection candidate table 2000, an extracted character string selected as a word candidate Wk1 is identified by the parent element number i1, the character string number j1, and the word candidate number k1. An extracted character string selected as a word candidate Wk2 is also identified by the child element number i2, the character string number j2, and the word candidate number k2.

Next, such relative positional information is identified in the connection information table 900 that corresponds with the relative positional information of the word candidate Wk1 of the parent element Ei1 and the word candidate Wk2 of the child element Ei2 identified in the connection candidate table 2000, and the connection frequency of such relative positional information is read out from the connection information table 900.

At the first line of the connection candidate table 2000, for example, in the case of {Ei1, j1, k1}={E0, 1, 0}, the extracted character string selected as a word candidate Wk1 is "FULL NAME" (see FIG. 15 or FIG. 17). In the case of {Ei2, j2, k2}={E0, 0, 0}, the extracted character string selected as a word candidate Wk2 Is "(FAMILY NAME)" (see FIG. 15 or FIG. 17).

In the combination of the parent element E0 and the child element E1, the connection information table 900 shown in FIG. 9 retains six different cases of relative positional information. In the form document 200 shown in FIG. 2, the extracted character string "FULL NAME" of the word candidate Wk1 belongs to the cell C1 and the extracted character string "(FAMILY NAME)" belongs to the cell C3.

Therefore, since the cell C3 is located one cell to the right of the cell C1, the horizontal distance is h=1, and since the cell C3 and the cell C1 are at the same position in the vertical direction, the vertical distance is v=0, and the connection frequency corresponding to {h, v}={1,0}, namely, 0.30, is read. This connection frequency is the transition probability p4(i1, j1, k1, i2, j2, k2), and this is also described simply as the transition probability p4.

The transition probability can be given by the following Equation 7, where i' represents the parent element of i.

$$p4(i1, j1, k1, i2, j2, k2) = \tag{7}$$
$$p(C = e_{ci}|C = e_{ci'}; x = x(O_{ij}) - x(O_{i'j'}), y = y(O_{ij}) - y(O_{i'j'}))$$

Figure 21:
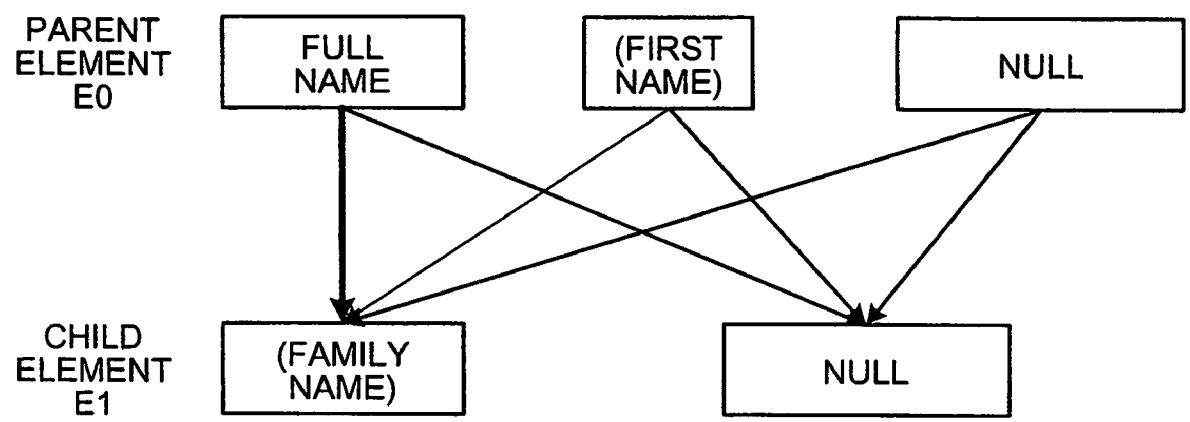
FIG. 21 is a schematic for illustrating transition probability of a word candidate of a parent element E0 and a word candidate to be a child element E1.

FIG. 21 is a schematic for illustrating transition probability of a word candidate of the parent element E0 and a word candidate likely to become the child element E1. The extracted character strings selected as a word candidate of the parent element E0 are "FULL NAME", "(FIRST NAME)", and "NULL". The extracted character strings selected as a word candidate of the child element E1 are "(FAMILY NAME)" and "NULL". An arrow indicates a parent-child relationship and an element from which the arrow starts is a word candidate of the parent element E0 and an element at which the arrow ends is a word candidate of the child element E1. The thickness of the arrow represents the height of the connection frequency (transition probability p4).

Figure 23:
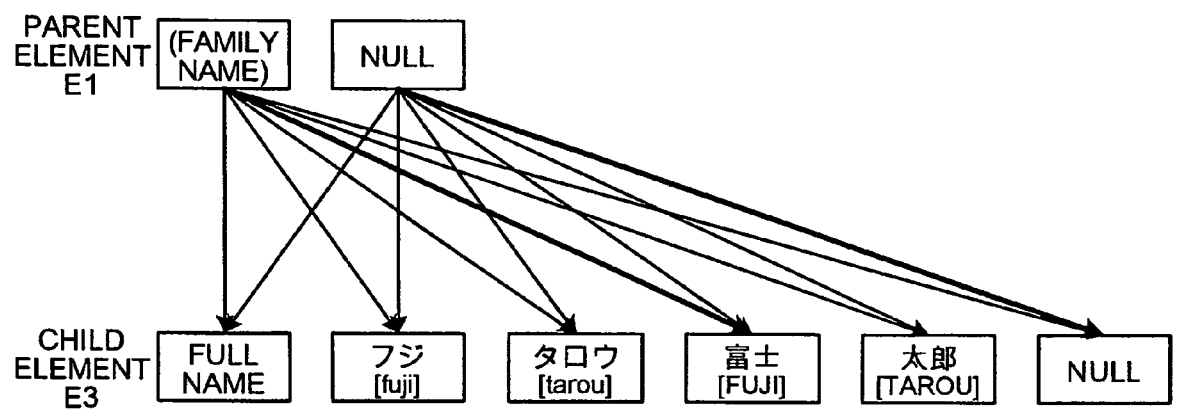
FIG. 23 is a schematic for illustrating transition probability of a word candidate of a parent element E1 and a word candidate to be a child element E2.

Likewise, FIG. 22 is an explanatory diagram of a connection candidate table of a connection relationship between the parent element Ei1=E1 and the child element Ei2=E2. FIG. 23 is a schematic for illustrating the transition probability p4 of a word candidate of the parent element E1 and a word candidate likely to become the child element E2.

When a plurality of word candidates are present in a cell, a weight is added and normalization is made. For example, against the word candidate Wk2 capable of becoming the child element Ei2 in the target area as seen from the parent element Ei1, weighting is made depending on the distance to be measured between a circumscribed rectangle of such word candidate Wk2 and a circumscribed rectangle of the word candidate Wk1 of the parent element E1.

Figure 24:
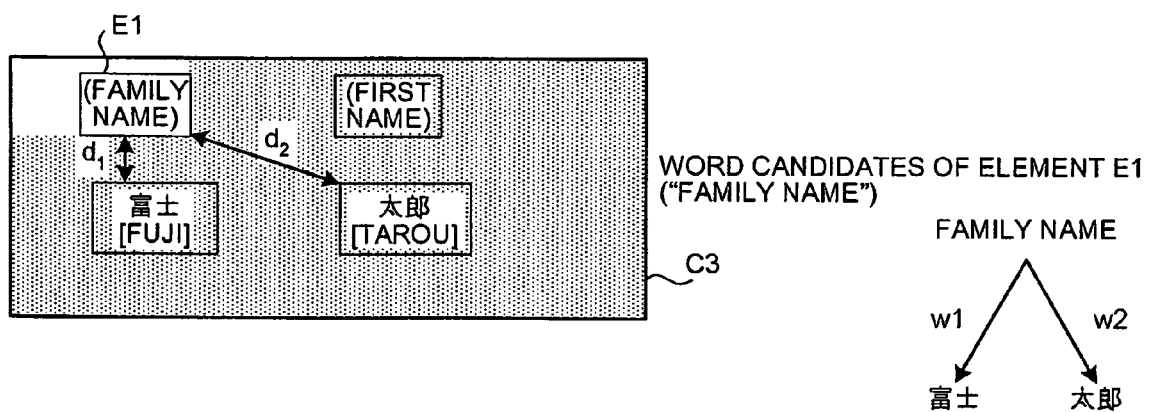
FIG. 24 is a schematic for illustrating weighting of transition frequency.

FIG. 24 is a schematic for illustrating weighting of the transition frequency. Weighting is not performed on the blank area. The gray area is set as the target area of weighting. As a weighting function, an exponential function is used. When "FUJI" and "TAROU" are present as family name data, the transition frequency from the word candidate of one parent element Ei1 for this cell C3 is given as the transition probability p4=0.3 and the distance of "FUJI" and "FUJI" from "(FAMILY NAME)" is given as d1 and d2, respectively.

An transition probability p4' on which weighting has been performed of a word candidate of one parent element Ei1 for the cell C3 and the family name data of "FUJI" is expressed by the following Equation 8.

$$p4'=p4 \times w1/(w1+w2)=0.3w1/(w1+w2) \tag{8}$$

Likewise, the transition probability p4' of a word candidate of one parent element Ei1 for the cell C3 and the family name data of "TAROU" is expressed by the following Equation 9.

$$p4'=p4 \times w2/(w1+w2)=0.3w1/(w1+w2) \tag{9}$$

This transition probability p4' is called a normalized transition probability p4'. In Equations 8 and Equation 9, w1 is a weight associated with the distance d1, and w2 is a weight associated with the distance d2. w1 and w2 are expressed by the following Equations 10 and 11.

$$w1 = \frac{\exp(-d_1^2)}{\exp(-d_1^2) + \exp(-d_2^2)} \tag{10}$$

$$w2 = \frac{\exp(-d_2^2)}{\exp(-d_1^2) + \exp(-d_2^2)} \tag{11}$$

When a NULL character string is the parent element Ei1, the transition probability p4 of the parent element of such element is used. For example, in an example shown in FIG. 20, in the case of the parent element E0 to the child element E1, the transition probability p4 from the NULL character string of the parent element E0 is p4=0 for the word candidate Wk2 of all child elements Ei2.

On the other hand, in an example of the parent element E1 to the child element E3 shown in FIG. 22, the transition probability P4 from the NULL character string of the parent element E1 is present. In this case, the transition probability from the element E0 as the parent element of the parent element E1 to the child element E3 is obtained using the connection information table 900. The extracted character strings selected as the word candidate Wk2 of the child element E3 ("FULL NAME", "fuji", "tarou", "FUJI", and "TAROU") are at the position of the transition probability p4={0.1, 0.3, 0.3, 0.3, 0.3}.

Out of these extracted character strings, however, "FULL NAME" can be excluded from the target area of FIG. 24, and therefore, the transition probability regarding "FULL NAME", P4=0.1, is changed to P4=0. Since the remaining character strings ("fuji", "tarou", "FUJI", and "TAROU"), though in different cells, are located in the cells that are one cell to the right of the cell C1 to which "FULL NAME" belongs, the transition probability p4=0.3 is normalized.

It is assumed that, after the weighting manipulation shown in FIG. 24, the transition probability p4 of these character strings has become p4={0.0, 0.1, 0.05, 0.1, 0.05}. When same manipulation is performed against the extracted character string "FIRST NAME" as the word candidate of the element E0, the transition probability is p4={0.0, 0.0, 0.1, 0.15, 0.15}, and after normalized, becomes p4'={0.0, 0.0, 0.1, 0.05, 0.1}. If the sum of these two values are calculated at the ratio of transition probability from each element of the parent element E0 to the NULL character string of the element E1, p4'={0, 0.08, 0.06, 0.09, 0.06} is obtained.

Figure 25:
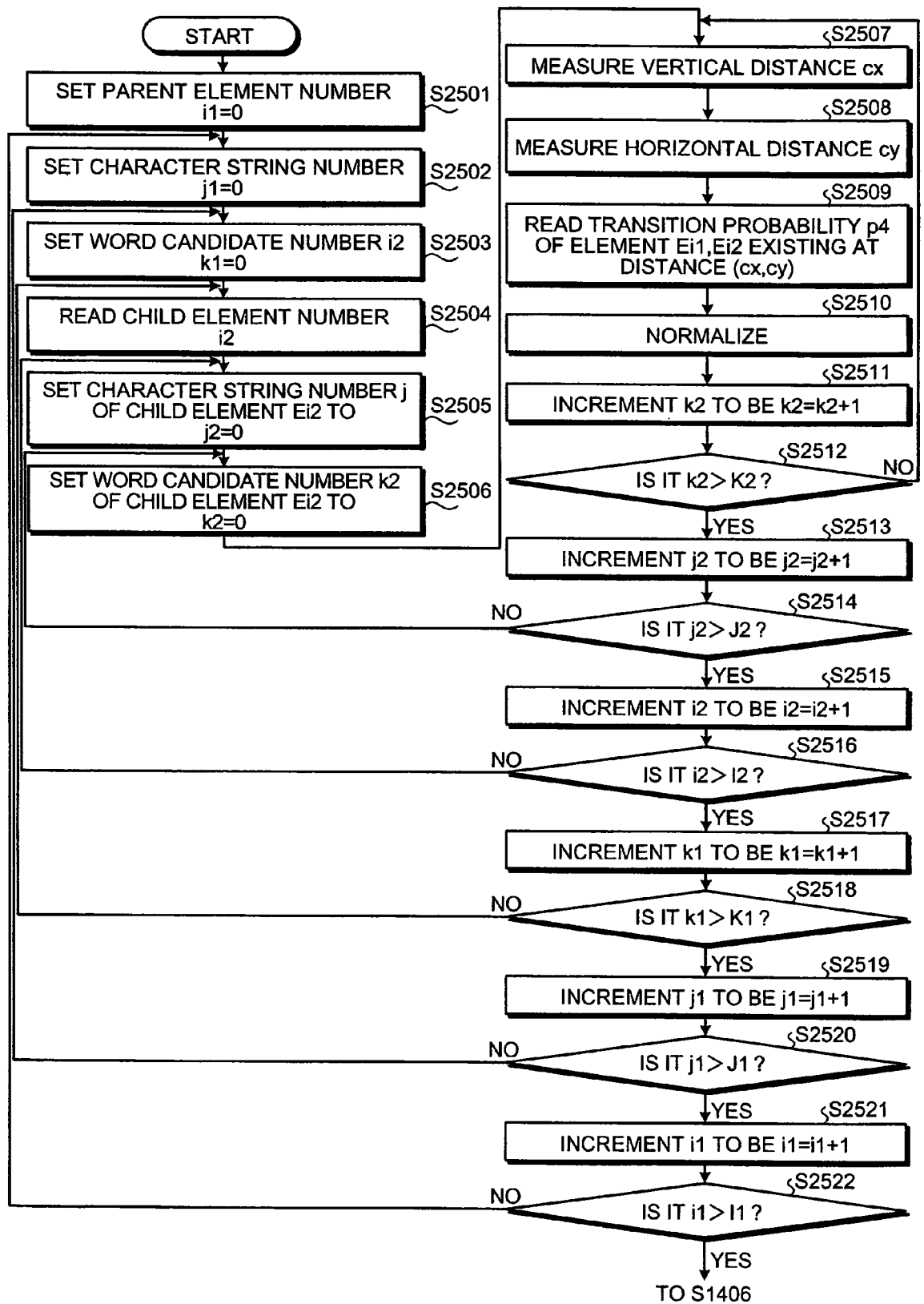
FIG. 25 is a flowchart of a relation digitizing process by a relation digitizing unit 1303 shown in FIG. 14.

FIG. 25 is a flowchart of the relation digitizing process by the relation digitizing unit 1303 shown in FIG. 14. First, the parent element number i1 is set to i1=0 (step S2501), the character string number j1 is set to j1=0 (step S2502), and the word candidate number k1 is set to k1=0 (step S2503). Next, the child element number i2 of the child element Ei2 of the parent element Ei1 is read (step S2504). Then, the character string number j2 of this child element Ei2 is set to j2=0 (step S2505), and word candidate number k2 of the child element Ei2 is set to k2=0 (step S2506).

Counting is made of the vertical distance cx from the parent element Ei1 to child element Ei2 (step S2507). Likewise, counting is made of the horizontal distance cy from the parent element Ei1 to the child element Ei2 (step S2508). The transition probability p4 of the parent element Ei1 and child element Ei2 present at the distance (cx, cy) is read out from the connection information table 900 (step S2509).

Then, the transition probability p4 is normalized (step S2510) to obtain a normalized transition probability p4'. Thereafter, the word candidate number k2 of the child element Ei2 is incremented (step S2511) and it is judged whether the word candidate number satisfies k2>K2 (step S2511). K2 is the number of word candidates for the character string number j2 of the child element Ei2.

If k2>K2 is not satisfied (step S2512: NO), the process returns back to step S2507. On the other hand, if k2>K2 is satisfied (step S2512: YES), the character string number j2 of the child element Ei2 is incremented (step S2513), and it is judged whether the character string number j2 of the child element Ei2 is greater than J2 (step S2514). J2 is the number of corresponding character strings of the child element Ei2.

If j2>J2 is not satisfied (step S2514: NO), then the process returns back to step S2506. On the other hand, if j2>J2 is satisfied (step S2514: YES), the child element number i2 is incremented (step S2515), and it is judged whether i2>I2 is satisfied (step S2516). I2 is the number of elements of the child element Ei2.

If i2>I2 is not satisfied (step S2516: NO), the process returns back to step S2505. On the other hand, if i2>I2 is satisfied (step S2516: YES), then the word candidate number k1 of the parent element Ei1 is incremented (step S2517) and it is judged whether the word candidate number k1>K1 is satisfied (step S2518). K1 is the number of word candidates for the character string number j1 of the parent element Ei1.

If k1>K1 is not satisfied (step S2518: NO), the process returns back to step S2504. On the other hand, if k1>K1 is satisfied (step S2518: YES), the character string number j1 of the parent element Ei1 is incremented (step S2519), and it is judged whether the character string number j1>J1 is satisfied (step S2520). J1 is the number of corresponding character strings of the parent element Ei1.

If j1>J1 is not satisfied (step S2520: NO), the process returns back to step S2503. On the other hand, if j1>J1 is satisfied (step S2520: YES), then the element number j1 of the parent element Ei1 is incremented (step S2521), and it is judged whether the parent element number i1>I1 is satisfied (step S2522). I1 is the number of elements of the parent element Ei1.

If i1>I1 is not satisfied (step S2522: NO), the process returns back to step S2502. On the other hand, if i1>I1 is satisfied (step S2522: YES), the process proceeds to the word evaluation process (step S1406). Thus, a series of relation digitizing process is finished. As seen above, the relation digitizing unit 1303 can digitize the frequency of positional correlation between word candidates of the parent element Ei1 and word candidates of the child element Ei2.

The evaluating unit 1304 calculates the probability of word candidates in each element Ei, taking into account the emission probability of words and the relationship between candidates regarding the word relationship. Specifically, for example, the Belief propagation can be applied.

With respect to word candidates, in accordance with the normalized transition probability p4 obtained by the relation digitizing unit 1303, a high probability is given to word candidates in such positions as to make up a combination appropriate for a hierarchical structure and otherwise a low probability is given.

As a similar method, there is a Hidden Markov model. As for the calculation method, there are many examples and a calculation may be made by an arbitrary method.

The evaluating unit 1304 calculates, in accordance with the normalized emission probability p3' obtained by the frequency digitizing unit 1302 and the normalized transition probability p4' obtained by the relation digitizing unit 1303, the posterior probability pp1 of respective word candidates Wk of each element Ei being character strings indicative of the element Ei on the form document 200.

FIG. 26 is a schematic of a third word candidate table obtained by the evaluating unit 1304. A third word candidate table 2600 is a word candidate table made by further adding the posterior probability pp1 for each element Ei to the second word candidate table 1700.

As a method of calculating the posterior probability pp1, calculation is made, considering the generic logical structure of the tree structure 1200 as a probability network. The calculation method in the case of the directed graph is presented here as an example. Calculation methods in the case of the undirected graph as well are already established, and these, because of the equivalence of the one-sided Markov and the both-sided Markov, only differ in the probability expression given. Therefore, are omitted. Specifically, the posterior probability pp1 can be given by a potential function changed from the normalized transition probability p4' between elements mentioned above.

Namely, the evaluating unit 1304 performs the digitization, considering the relationship between character strings, against the graph formed according to the relation between the element and the connection of the generic logical structure. This can be practiced by applying the probabilistic propagation against the graph given above.

Three processes are required for the calculation of the directed graph of the tree structure 1200, a forward process in which calculation is made from the parent element Ei1 as the upper layer, a backward process in which calculation is made from the lower layer to the parent element Ei1, and the process of calculating the posterior probability.

The forward process calculates, in the case of the word candidate Wi2 of the lower (child) element Ei2, the probability pf(i, j, k) indicative of the credibility of word candidates of all upper (parent) elements Ei1 to such lower element Ei2. The probability pf(i, j, k), which will occasionally be noted simply as a probability pf, is expressed by the following Equation 12.

$$pf(i, j, k) = \text{sum\_}i' \text{sum\_}j' \text{sum\_}k' p3(i, j) \times \quad (12)$$
$$p4(i', i, j', j, k', k) \times pf(i', j', k');$$
$$p(\{O_i\}^-, M_{ij} = e_{Mijk}, Ti = e_{Tij}, C = e_{ci})$$
$$= \underset{i' j' k'}{ZZZ} p(O_{ijk}, M_{ij} = e_{Mijk}, T_i = e_{Tij} | C = e_{ci})$$
$$p(C = e_{ci} | C = e_{ci'}; x(O_{ijk}) - x(O_{i' j' k'}), y(O_{ijk}) -$$
$$y(O_{i' j' k'}))p(\{O_{i'}\}^-, M_{i' j'} = e_{Mi' j' k'}, T_{i'}$$
$$= e_{Ti' j'}, C = e_{ci'})$$

In Equation 12, i' indicates the parent element of the element Ei, j' indicates the character string number of the parent element i', and k' indicates the word candidate number extracted by the character string number j'. $\{O_i\}^-$ indicates all word candidates on the upper layer for the character string i.

The backward process calculates, in the case of the word candidate Wi1 of the upper (parent) element Ei1, the probability pb(i, j, k) indicative of the credibility of word candidates of all lower (child) elements Ei2 to such upper element Ei1. The probability pb(i, j, k), which will occasionally be noted simply as a probability pb, is expressed by the following Equation 13.

$$pb(i, j, k) = \text{sum\_}i' \text{sum\_}j' \text{sum\_}k' pb(i', j', k') \times \qquad (13)$$
$$p4(i, i', j, j', k, k') \times p3(i, j, k) p$$
$$(\{O_i\}^-, T_i | C = e_{Ci})$$
$$= \sum_{i'} \sum_{j'} \sum_{k'} p(O_{ij}, T_i | C = e_{Ci}) p(C = e_{Ci} | C = e_{Ci};$$
$$x(O_{i'j'}) - x(O_{ij}), y(O_{i'j'}) -$$
$$y(O_{ij})) p(\{O_{ij}\}^+ | C = e_{Ci'})$$

In the equation (13), i' indicates the child element of the element Ei, j' indicates the character string number of the child element i', and k' indicates the word candidate number extracted by the character string number j'.

The posterior probability calculation process calculates the posterior probability pp1($i, j, k$) of the corresponding character string Mij of the element Ei to the word candidate Wk. Hereinafter, the posterior probability pp1($i, j, k$) will occasionally be noted simply as pp1. The posterior probability pp1($i, j, k$) is expressed by the following Equations 14 to 17.

$$pp1(i, j, k) = pp11(i, j, k) / pp12(i) \qquad (14)$$

$$pp11(i, j, k) = \qquad (15)$$
$$\text{sum\_}i' \text{sum\_}j' \text{sum\_}k' pf(i', j', k') \times p4(i', i, j', j, k', k) \times pb(i, j, k)$$

$$pp12(i) = \text{sum\_}j \text{sum\_}k \text{sum\_}i' \text{sum\_}j' \text{sum\_}k' \qquad (16)$$
$$pf(i', j', k') \times p4(i', i, j', j, k', k) \times pb(i, j, k)$$

$$\frac{p(M_{ij} = e_{M_{ijk}}, T_i = e_{T_{ij}} |}{C = e_{Ci'} \{O_i\})} = \frac{p(M_{ij} = e_{M_{ijk}}, T_i = e_{T_{ij}} | C = e_{Ci'} \{O_i\})}{p(C = e_{Ci'} \{O_i\})} \qquad (17)$$
$$= \frac{\sum_{i'} \sum_{j'} \sum_{k'} p(\{O_j\}^+, M_{ij} = e_{M_{ijk}}, T_i = e_{T_{ij}} | C = e_{Ci}) p(C = e_{Ci'} | C = e_{Ci}; x (O_{i',j',k'}) - x(O_{ijk}), y(O_{i'j'k'})) p(\{O_i\}^- M_{ij} = e_{M_{ijk}}, T_{i'} = e_{T_{i'j'}} | C = e_{Ci'})}{\sum_j \sum_k \sum_{i'} \sum_{j'} \sum_{k'} p(\{O_j\}^+, M_{ij} = e_{M_{ijk}}, T_i = e_{T_{ij}} | C = e_{Ci}) p(C = e_{Ci}; x(O_{i',j',k'}) - x(O_{ijk}), y(O_{i'j'k'}) - y(O_{ijk})) p(\{O_i\}^-, M_{ij} = e_{M_{ijk}}, T_{i'} = e_{T_{i'j'}} | C = e_{Ci'})}$$

In the Equations 14 to 17, i' indicates the parent element of the element Ei, j' indicates the character string number of the parent element i', and k' indicates the word candidate number extracted by the character string number j'. It is assumed that $\{O_i\}$ is an observation to all logical elements. All of these processes are executed against the word candidate Wk of the corresponding character string Mji of all elements Ei.

The calculation of the posterior probability pp1 by the posterior probability calculation process means, when a parent element Ei1 is present and a plurality of word candidate Wk2 are present in the child element Ei2 thereof, the work of seeking favorable word candidate Wk2 out of these word candidates.

Out of the above three processes, the forward process executes the calculation from the upper layer and calculates the probability pf of a current layer, using the probability pf obtained at the upper layer. This processing can be realized by a recursive processing. Conversely, the backward process calculates the probability pb of a current layer, using the probability pb obtained at the lower layer. This process can also be realized by the recursive processing. Specific examples are given below.

Figure 27:
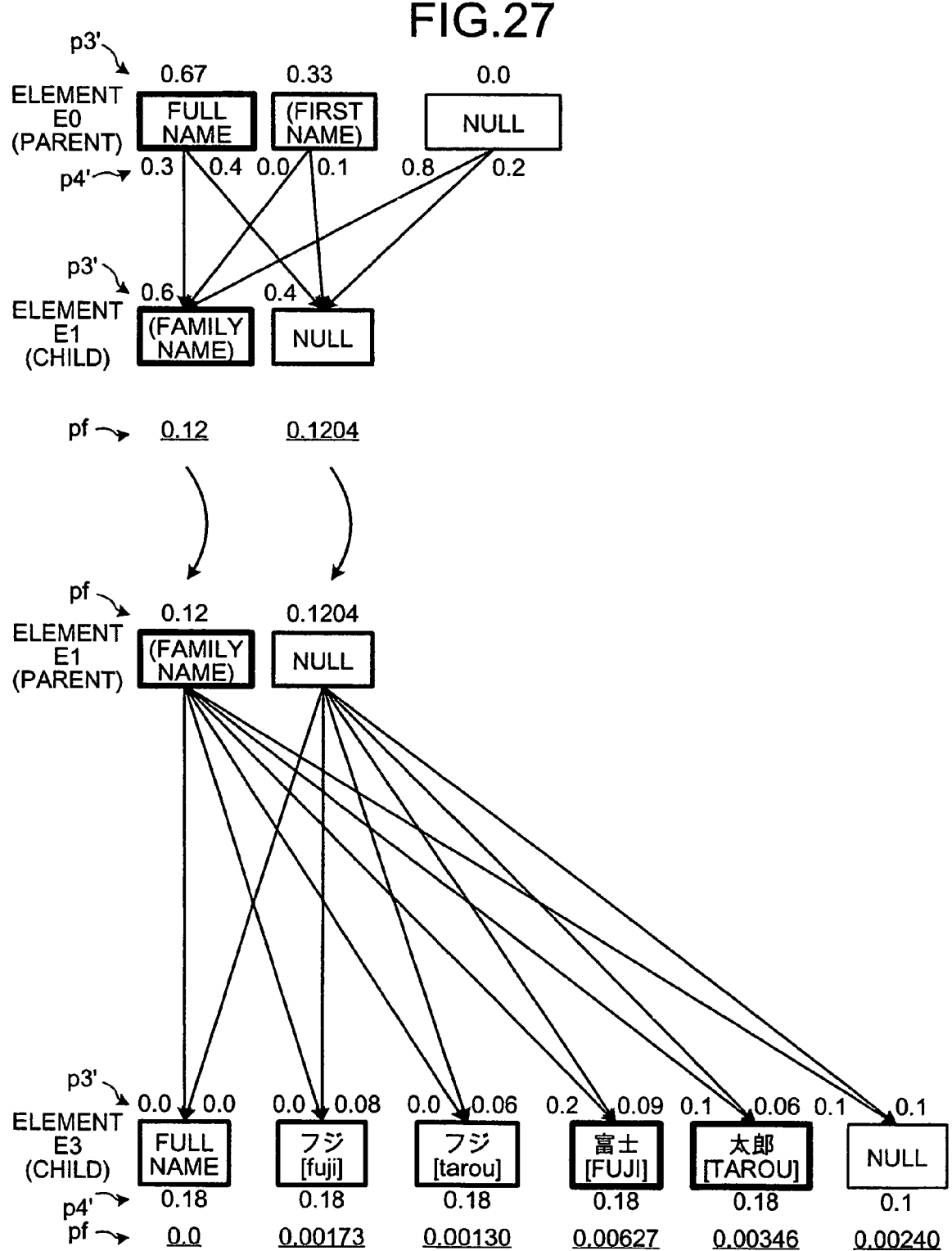
FIG. 27 is a schematic for explaining calculation of a forward process.

FIG. 27 is a schematic for explaining calculation of the forward process. The probability pfx of appearance of a word candidate of the child element E1 when a word candidate of the parent element E0 appears is shown in the following Equation 18.

$$pfx=(p3' \text{ of parent element } E0) \times (p4' \text{ of parent element } E0 \text{ to child element } E1) \times (p3' \text{ of child element } E1) \qquad (18)$$

For example, referring to FIG. 27, when the word candidate of the parent element E0 is "FULL NAME" and the word candidate of the child element E1 is "(FAMILY NAME)", relevant figures are put into Equation 18 and calculation is made as follows.

$$Pf1=0.67 \times 0.3 \times 0.6=0.12$$

When the word candidate of the parent element E0 is "(FIRST NAME)" and the word candidate of the child element E1 is "(FAMILY NAME)", relevant figures are put into Equation 18 and calculation is made as follows.

$$Pf2=0.33 \times 0.0 \times 0.6=0$$

When the word candidate of the parent element E0 is NULL and the word candidate of the child element E1 is "(FAMILY NAME)", relevant figures are put into Equation 18 and calculation is made as follows.

$$Pf3=0.0 \times 0.8 \times 0.6=0$$

The total of the probabilities pf1 to pf3 of the propagation from these word candidates "FULL NAME", "(FIRST NAME)" and NULL of the parent element E0 to the word candidate "(FAMILY NAME)" of the child element E1 comes to the probability pf(0.12+0+0=0.12).

Next, the element E1 that is a child element in relation to the parent element E0 becomes a parent element in relation to the element E3. The probability pfy of the propagation from a word candidate of the element E1 to a word candidate of the child element E3 is shown in the following Equation 19.

$$pfy=(pf \text{ of parent element } E1) \times (p3' \text{ of child element } E3) \times (p4' \text{ of child element } E3 \text{ to parent element } E1) \qquad (19)$$

For example, referring to FIG. 27, when a word candidate of the parent element E1 is "(FAMILY NAME)" and a word candidate of the child element E3 is "FUJI.", relevant figures are put into Equation 19 and calculation is made as follows.

$$Pf1=0.12 \times 0.2 \times 0.18=0.00432$$

When a word candidate of the parent element E1 is NULL and a word candidate of the child element E3 is "FUJI", relevant figures are put into Equation 19 and calculation is made as follows.

$$Pf2=0.1204 \times 0.09 \times 0.18=0.00195$$

The total of the probabilities pf1 and pf2 of the propagation from these word candidates "(FAMILY NAME)" and NULL of the parent element E1 to the word candidate "FUJI" of the child element E3 comes to the probability pf(=0.00432+0.00195=0.00627).

Figure 28:
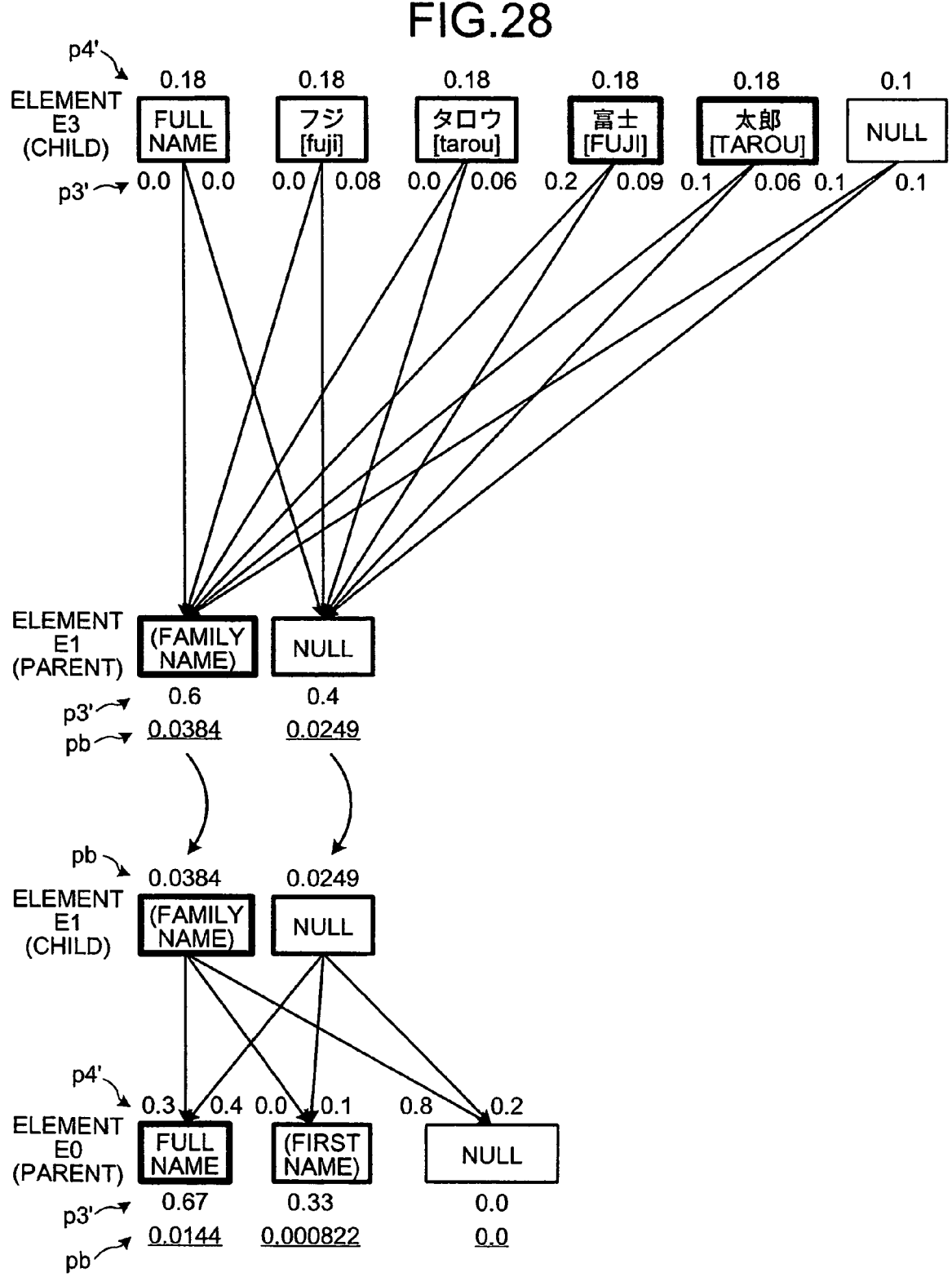
FIG. 28 is a schematic for explaining calculation of a backward process.

FIG. 28 is a schematic for explaining calculation of the backward process. The probability pbx of the propagation from a word candidate of the child element E3 to a word candidate of the parent element E1 is shown in the following Equation 20.

$$pbx = (p4' \text{ of child element } E3 \text{ to parent element } E1) \times (p3' \text{ of child element } E3) \times (p3' \text{ of parent element } E1) \quad (20)$$

For example, referring to FIG. 28, when a word candidate of the child element E3 is "FULL NAME" and a word candidate of the parent element E1 is "(FAMILY NAME)", relevant figures are put into Equation 20 and calculation is made as follows.

$$pb1 = 0.18 \times 0.0 \times 0.6 = 0$$

When a word candidate of the child element E3 is "fuji" and a word candidate of the parent element E1 is "FAMILY NAME", relevant figures are put into the Equation 20 and calculation is made as follows.

$$pb2 = 0.18 \times 0.0 \times 0.6 = 0$$

When a word candidate of the child element E3 is "tarou" and a word candidate of the parent element E1 is "(FAMILY NAME)", relevant figures are put into the equation (20) and calculation is made as follows;

$$pb3 = 0.18 \times 0.0 \times 0.6 = 0$$

When a word candidate of the child element E3 is "FUJI" and a word candidate of the parent element E1 is "(FAMILY NAME)", relevant figures are put into Equation 20 and calculation is made as follows.

$$pb4 = 0.18 \times 0.2 \times 0.6 = 0.216$$

When a word candidate of the child element E3 is "TAROU" and a word candidate of the parent element E1 is "(FAMILY NAME)", relevant figures are put into Equation 20 and calculation is made as follows.

$$pb5 = 0.18 \times 0.1 \times 0.6 = 0.0108$$

When a word candidate of the child element E3 is NULL and a word candidate of the parent element E1 is "(FAMILY NAME)", relevant figures are put into Equation 20 and calculation is made as follows.

$$pb6 = 0.1 \times 0.1 \times 0.6 = 0.006$$

The total of the probabilities pb1 to pb6 of the propagation from these word candidates "FULL NAME" to NULL of the child element E3 to the word candidate "(FAMILY NAME)" of the parent element E1 comes to the probability pb(=0+0+0+0.0216+0.0108+0.006=0.0384).

Next, the element E1 that is a parent element in relation to the child element E3 becomes a child element in relation to the element E0. The probability pby of the propagation from a word candidate of the element E1 to a word candidate of the parent element E0 is shown in the following Equation 21.

$$pby = (pb \text{ of child element } E1) \times (p4' \text{ of parent element } E0 \text{ to child element } E1) \times (p3' \text{ of parent element } E0) \quad (21)$$

For example, referring to FIG. 28, when a word candidate of the child element E1 is "(FAMILY NAME)" and a word candidate of the parent element E0 is "FULL NAME", relevant figures are put into Equation 21 and calculation is made as follows.

$$pb1 = 0.0384 \times 0.3 \times 0.67 = 0.00771$$

When a word candidate of the child element E1 is NULL and a word candidate of the parent element E0 is "FULL NAME", relevant figures are put into the equation (21) and calculation is made as follows;

$$pb2 = 0.0249 \times 0.4 \times 0.67 = 0.00667$$

A total of the probabilities pb1 and pb2 of the propagation from these word candidates "(FAMILY NAME)" and NULL of the child element E1 to the word candidate "FULL NAME" of the parent element E0 comes to the probability pb(=0.00771+0.00667=0.0144).

Figure 29:
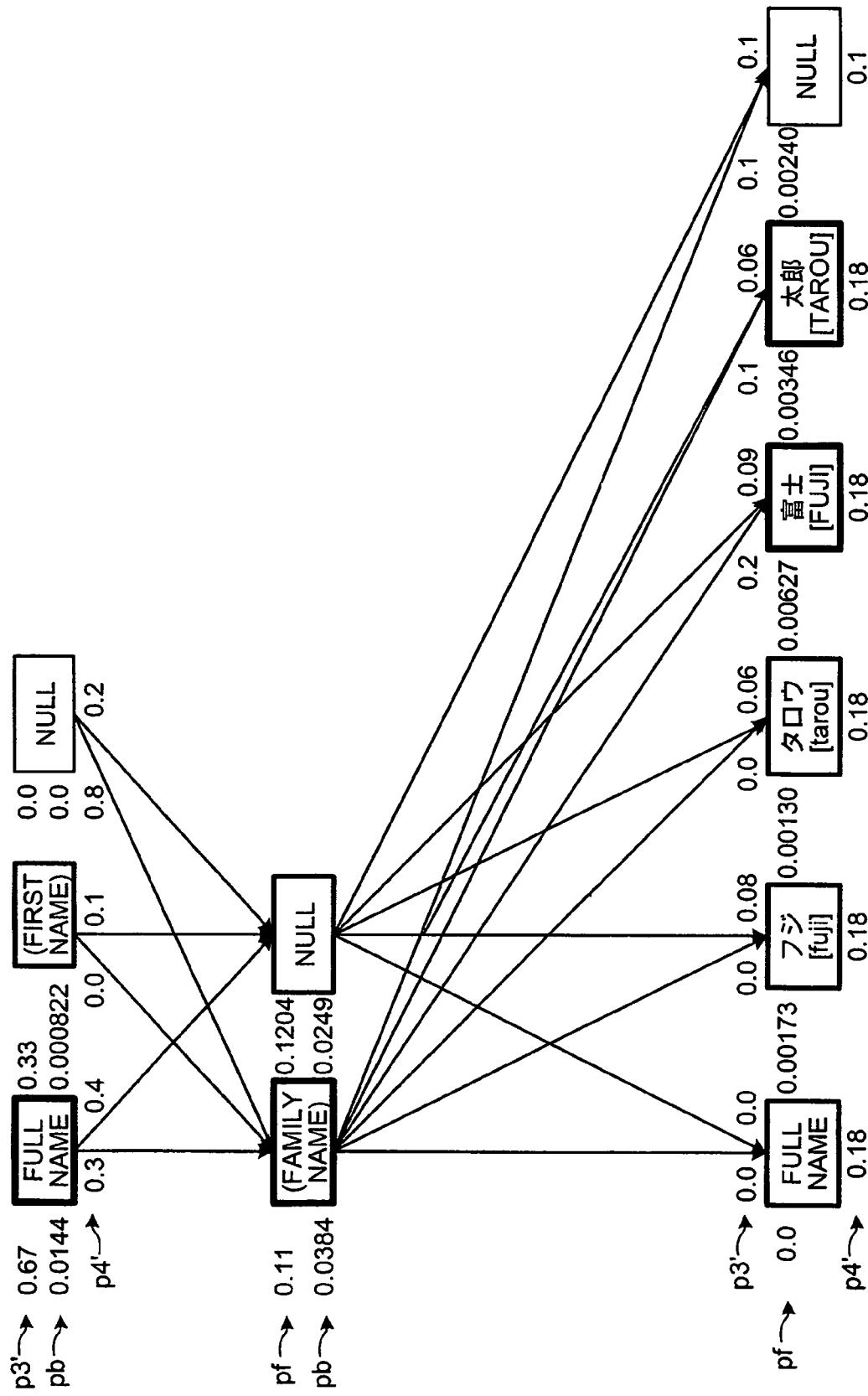
FIG. 29 is a schematic for explaining calculation of a posterior probability calculation process.

FIG. 29 is a schematic for explaining calculation in the posterior probability calculation process. The character strings "FULL NAME", "(FIRST NAME)", and NULL on the upper line are word candidates of the element E0, the character strings "(FAMILY NAME)" and NULL in the middle line are word candidates of the element E1, and the character strings "FULL NAME" to NULL in the lower line are word candidates of the element E3.

The posterior probability of the element E0 is the probability obtained by normalizing the probability pb obtained by the backward process shown in FIG. 28. The probability pb of word candidates "FULL NAME", "(FIRST NAME)", and NULL of the element E0 is 0.0144, 0.000822, and 0.0, respectively and the total thereof is 0.015222. Therefore, by normalizing with the probability pb of word candidates "FULL NAME", "(FIRST NAME)", and NULL of the element E0, the posterior probability pp1 of the word candidate "FULL NAME" is calculated as follows.

$$pp1 = 0.0144/0.015222 = 94.6\%$$

Likewise, by normalizing with the probability pb of word candidates "FULL NAME", "(FIRST NAME)", and NULL of the element E0, the posterior probability pp1 of the word candidate "(FIRST NAME)" of the element E0 is calculated as follows.

$$pp1 = 00.000822/(0.0144 + 0.000822 + 0.0) = 5.4\%$$

Likewise, by normalizing with the probability pb of word candidates "FULL NAME", "(FIRST NAME)", and NULL of the element E0, the posterior probability pp1 of the character string NULL of the element E0 is calculated as follows.

$$pp1 = 0.0/(0.0144 + 0.000822 + 0.0) = 0\%$$

The posterior probability of the element E1 is also the probability obtained by normalizing the probability pb obtained by the backward process shown in FIG. 28. When a word candidate of the child element E1 is "(FAMILY NAME)" and a word candidate of the parent element E0 is "FULL NAME", relevant figures are put into Equation 21 and calculation is made as follows.

$$pb1 = 0.0384 \times 0.3 \times 0.67 = 0.00771$$

When a word candidate of the child element E1 is NULL and a word candidate of the parent element E0 is "FULL NAME", relevant figures are put into Equation 21 and calculation is made as follows.

$$pb2 = 0.0249 \times 0.4 \times 0.67 = 0.00667$$

When a word candidate of the child element E1 is "(FAMILY NAME)" and a word candidate of the parent element E0 is "(FIRST NAME)", relevant figures are put into Equation 21 and calculation is made as follows.

$$pb3 = 0.0384 \times 0.0 \times 0.33 = 0$$

When a word candidate of the child element E1 is NULL and a word candidate of the parent element E0 is "(FIRST NAME)", relevant figures are put into Equation 21 and calculation is made as follows.

$$pb4=0.0249\times0.1\times0.33=0.00082$$

When a word candidate of the child element E1 is "(FAMILY NAME)" and a word candidate of the parent element E0 is NULL, relevant figures are put into Equation 21 and calculation is made as follows.

$$pb5=0.0384\times0.8\times0.0=$$

When a word candidate of the child element E1 is NULL and a word candidate of the parent element E0 is NULL, relevant figures are put into Equation 21 and calculation is made as follows.

$$Pb6=0.0249\times0.2\times0.0=0$$

The posterior probability pp1 of the word candidate "(FAMILY NAME) of the element E1 is calculated, by normalizing the probability pb1 of such word candidate with the probabilities pb1 to pb6 as follows.

$$pp1 = (pb1 + pb3 + pb5)/(pb1 + pb2 + pb3 + pb4 + pb5 + pb6)$$
$$= 0.00771/(0.00771 + 0.00667 + 0 + 0.00082 + 0 + 0)$$
$$= 0.00771/0.0152$$
$$= 51\%$$

Likewise, the posterior probability pp1 of the character string NULL of the element E1 to the word candidate "FULL NAME" of the element E0 is calculated, by normalizing the probability pb1 of such character string with the probabilities pb1 to pb6 as follows.

$$pp1 = (pb2 + pb4 + pb6)/(pb1 + pb2 + pb3 + pb4 + pb5 + pb6)$$
$$= (0.00667 + 0.00082)/(0.00771 + 0.0067 + 0 +$$
$$0.00082 + 0 + 0)$$
$$= 0.00749/0.0152$$
$$= 49\%$$

The posterior probability of the element E3 is the probability obtained by normalizing the probability pf obtained by the forward process shown in FIG. 27. The probability pf of word candidates "FULL NAME" to NULL of the element E3 is 0.0, 0.00173, 0.00130, 0.00627, 0.00346, and 0.00240, respectively and the total thereof is 0.01516. Therefore, by normalizing with the probability pf of word candidates "FULL NAME" to NULL of the element E3, the posterior probability pp1 of the word candidate "FULL NAME" of the element E3 is calculated as follows.

$$pp1=0.0/0.01516=0\%$$

Likewise, by normalizing with the probability pf of word candidates "FULL NAME" to NULL of the element E3, the posterior probability pp1 of the word candidate "fuji" of the element E3 is calculated as follows.

$$pp1=0.00173/0.01516=12\%$$

Likewise, by normalizing with the probability pf of word candidates "FULL NAME" to NULL of the element E3, the posterior probability pp1 of the word candidate "tarou" of the element E3 is calculated as follows.

$$pp1=0.00130/0.01516=9.1\%$$

Likewise, by normalizing with the probability pf of word candidates "FULL NAME" to NULL of the element E3, the posterior probability pp1 of the word candidate "FUJI" of the element E3 is calculated as follows.

$$pp1=0.00627/0.01516=41.2\%$$

Likewise, by normalizing with the probability pf of word candidates "FULL NAME" to NULL of the element E3, the posterior probability pp1 of the word candidate "TAROU" of the element E3 is calculated as follows.

$$pp1=0.00346/0.01516=22.4\%$$

Likewise, by normalizing with the probability pf of word candidates "FULL NAME" to NULL of the element E3, the posterior probability pp1 of the character string NULL of the element E3 is calculated as follows.

$$pp1=00.00240/0.01516=15.3\%$$

As a result, in the element E0, the word candidate "FULL NAME" appears with the posterior probability pp1=94.6% and the word candidate "(FIRST NAME)" appears with the posterior probability pp1=5.4%. In the element E1, the word candidate "(FAMILY NAME)" appears with the posterior probability pp1=51% and the character string NULL exists with the posterior probability pp1=49%. This means that the probability of appearance of the word candidate "(FAMILY NAME)" is higher than the probability of non-appearance of such word candidate. In the element E3, the family name data is "FUJI", "TAROU", character string NULL, "fuji", and "tarou", in a descending order of the probability.

Figure 30:
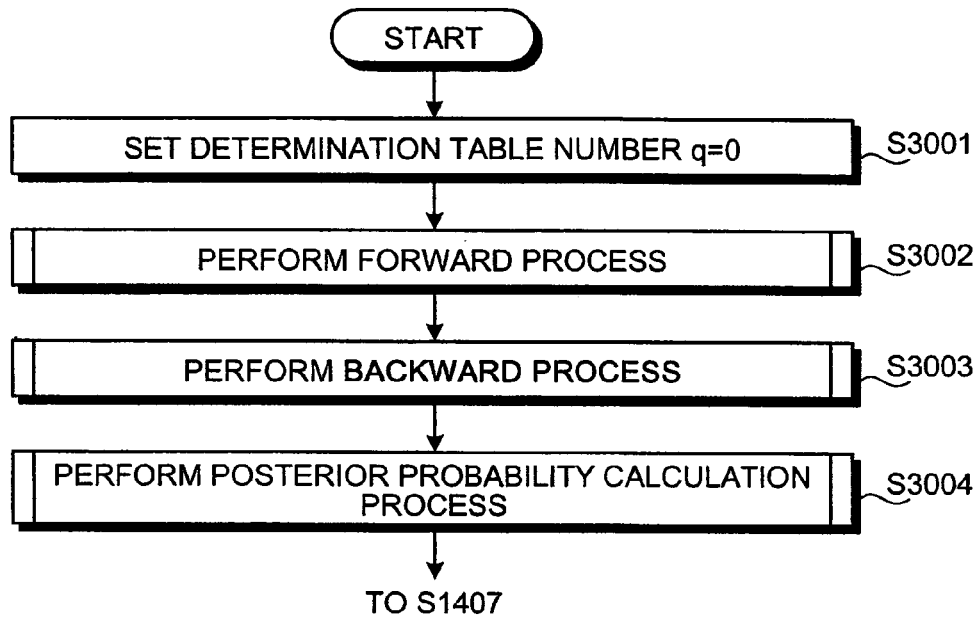
FIG. 30 is a flowchart of a word evaluation process by the evaluating unit 1304 shown in FIG. 14.

FIG. 30 is a flowchart of the word evaluation process by the evaluating unit 1304 shown in FIG. 14. First, a determination table number is set to q=0 (step S3001). Next, the forward process (step S3002), the backward process (step S3003), and the posterior probability calculation process (step S3004) are performed and the process proceeds to the word determination process (step S1407). Thus, the word evaluation process is finished.

Figure 31:
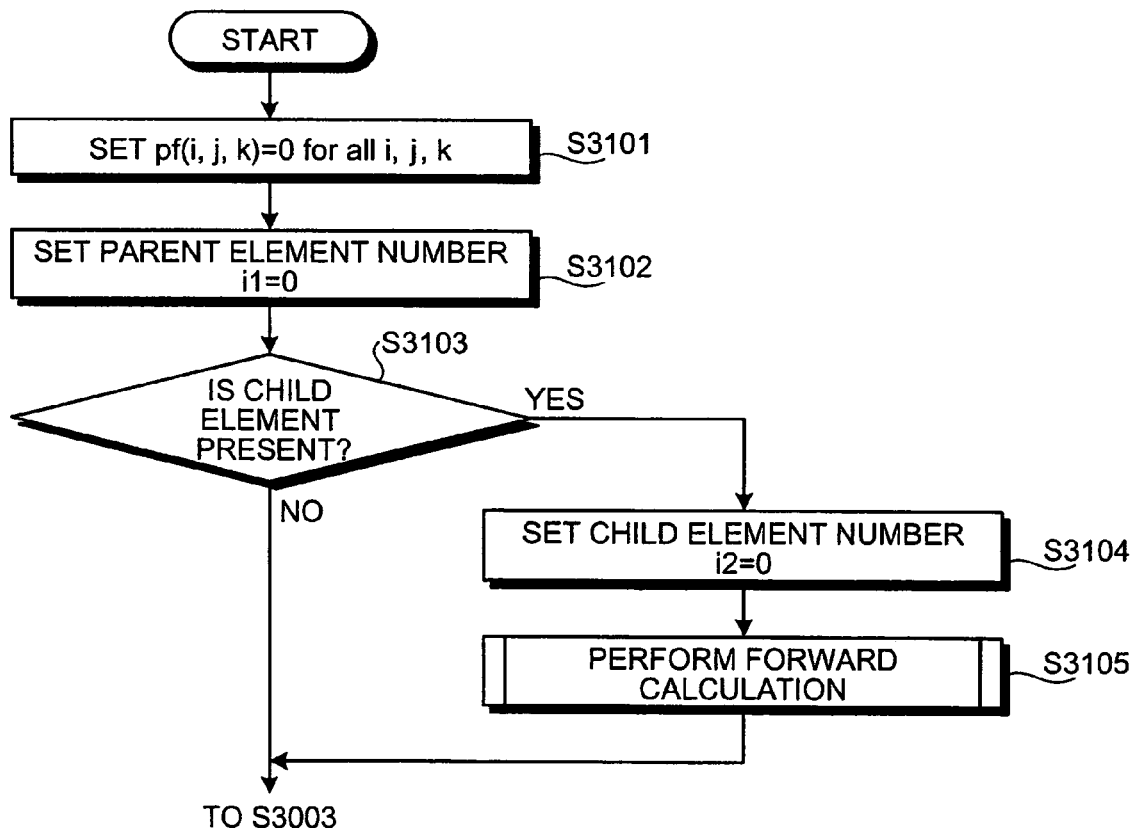
FIG. 31 is a flowchart of a specific procedure in the forward process.

FIG. 31 is a flowchart of a specific processing procedure in the forward process. The probability pf(i, j, k) is set to pf=0 (step S3101) and the element number i1 of the parent element is set to i1=0 (step S3102).

Next, it is judged whether a child element to this parent element Ei1 is present (step S3103). If a child element is not present (step 3103: NO), the process goes to the backward process (step S3103). On the other hand, if a child element is present (step 3103: YES), the element number i2 of the child element is set to i2=0 (step S3104) and the forward calculation process is executed (step S3105). After the forward process, the process goes to the backward process (step S3003).

Figure 32:
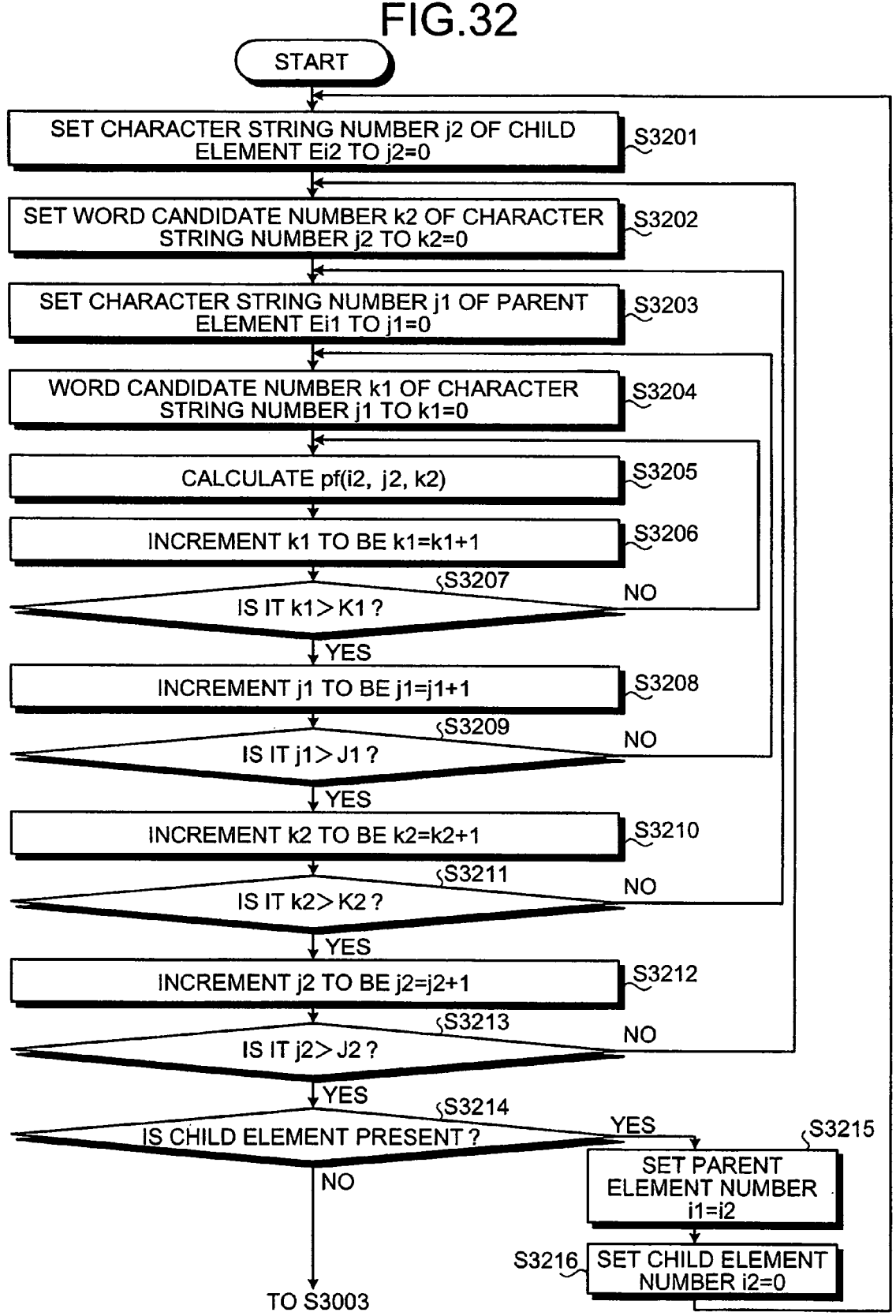
FIG. 32 is a flowchart of a specific procedure in a forward calculation process shown in FIG. 31.

FIG. 32 is a flowchart of a specific procedure in the forward calculation process shown in FIG. 31. The character string number j2 of the child element Ei2 is set to j2=0 (step S3201) and the word candidate number k2 of the character string number j2 is set to k2=0 (step S3202). Also, the character string number j1 of the parent element Ei1 is set to j1=0 (step S3203) and the word candidate number k1 of the character string number j1 is set to k1=0 (step S3204).

Next, the probability pf(i2, j2, k2) that a word of the parent element Ei1 of the child element Ei2 is the word candidate Wk is calculated (step S3205). The probability pf(i2, j2, k2) is calculated by the following Equation 22.

$$Pf(i2, j2, k2) = \qquad (22)$$
$$p4'(i1, i2, j1, j2, k1, k2) \times pf(i1, j1, k1) \times p3'(i2, j2, k2)$$

When the parent element Ei1 of the child element Ei2 is not present (for example, child element Ei2=element E0), pf(i1, j1, k1) is substituted by the normalized emission probability p3(i1, j2, k2) of such child element Ei2.

Thereafter, the word candidate number k1 of the parent element Ei1 is incremented (step S3206), and it is judged whether the word candidate number k1>K1 is satisfied (step S3207). K1 is the number of word candidates for the character string number j1 of the parent element Ei1.

If k1>K1 is not satisfied (step S3207: NO), then the process returns back to step S3205 to calculate the probability pf(i2, j2, k2). On the other hand, if k1>K1 is satisfied (step S3207: YES), then the character string number j1 of the parent element Ei1 is incremented (step S3208), and it is judged whether the character string number j1>J1 is satisfied (step S3209). J1 is the number of the corresponding character strings of the parent element Ei1.

If j1>J1 is not satisfied (step S3209: NO), the process returns back to step S3204. On the other hand, if j1>J1 is satisfied (step S3209: YES), the word candidate number k2 of the child element Ei2 is incremented (step S3210), and it is judged whether the word candidate number k2>K2 is satisfied (step S3211). K2 is the number of word candidates for the character string number j2 of the child element Ei2.

If k2>K2 is not satisfied (step S3211: NO), the process returns back to step S3203. On the other hand, if k2>K2 is satisfied (step S3211: YES), the character string number j2 of the child element Ei2 is incremented (step S3212), and it is judged whether the character string number j2>J2 is satisfied (step S3213). J2 is the number of corresponding character strings of the child element Ei2.

If j2>J2 is not satisfied (step S3213: NO), the process goes back to step S3202. On the other hand, if j2>J2 is satisfied (step S3213: YES), it is judged whether any further child element is present (step S3214). If no further child element is present (step S3214: NO), the forward calculation processing is finished and the process goes to step S3003.

On the other hand, if any further child element to the child element Ei2 is present (step S3214: YES), the parent number i1 is set to i1=i2 (step S3215). Namely, the child element Ei2 is changed to the parent element Ei2. Then, child element number i2 is set to i2=0 (step S3216) and the process goes back to step S3201. In this manner, the forward calculation process is executed until no further child element is present.

Figure 33:
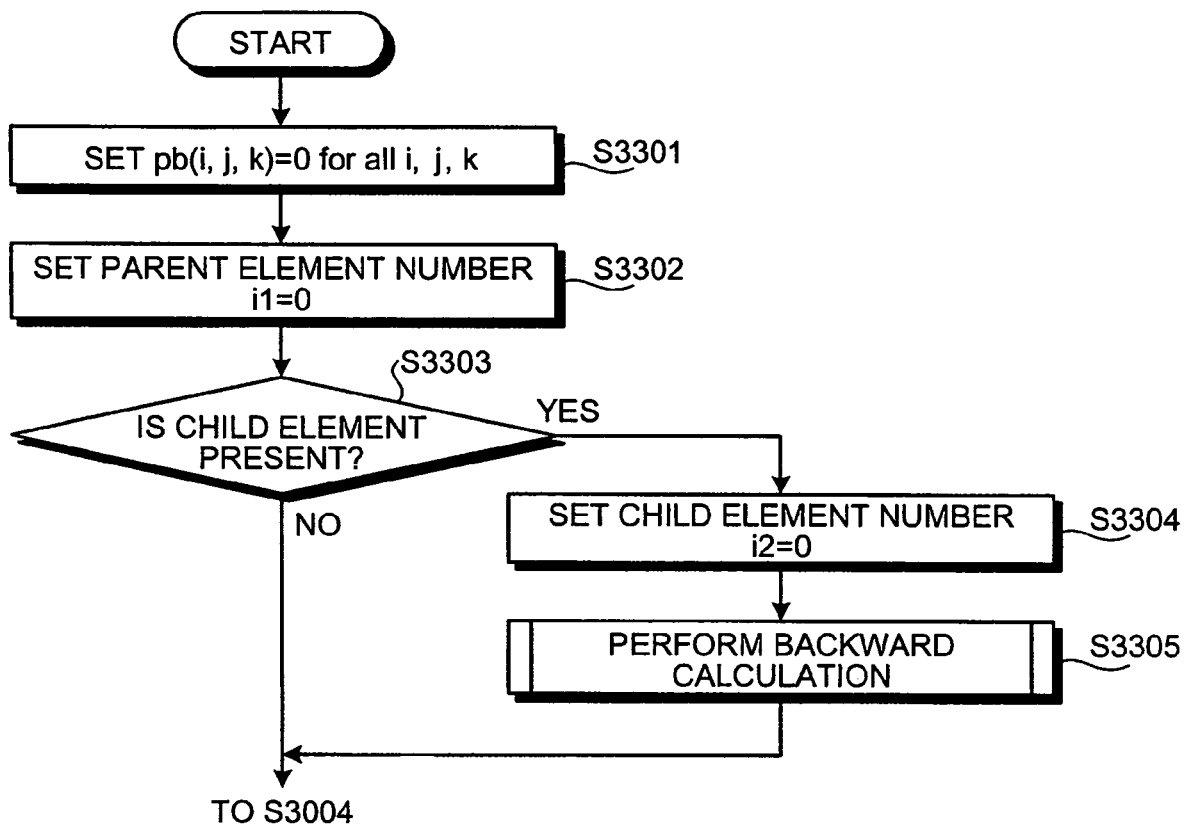
FIG. 33 is a flowchart of a specific procedure in the backward process.

FIG. 33 is a flowchart of a specific procedure in the backward process. The probability pb(i, j, k) is set to 0 (step S3301). Then, the element number i1 of the parent element is set to i1=0 (step S3302).

Next, it is judged whether a child element to this parent element Ei1 is present (step S3303). If no child element is present (step S3303: NO), then the process goes to the posterior probability calculation process (step S3004). On the other hand, if a child element is present (step S3303: YES), the element number i2 of the child element is set to i2=0 (step S3304) and the backward calculation process is executed (step S3305). After the backward calculation process, the process goes to the posterior probability calculation process (step S3004).

Figure 34:
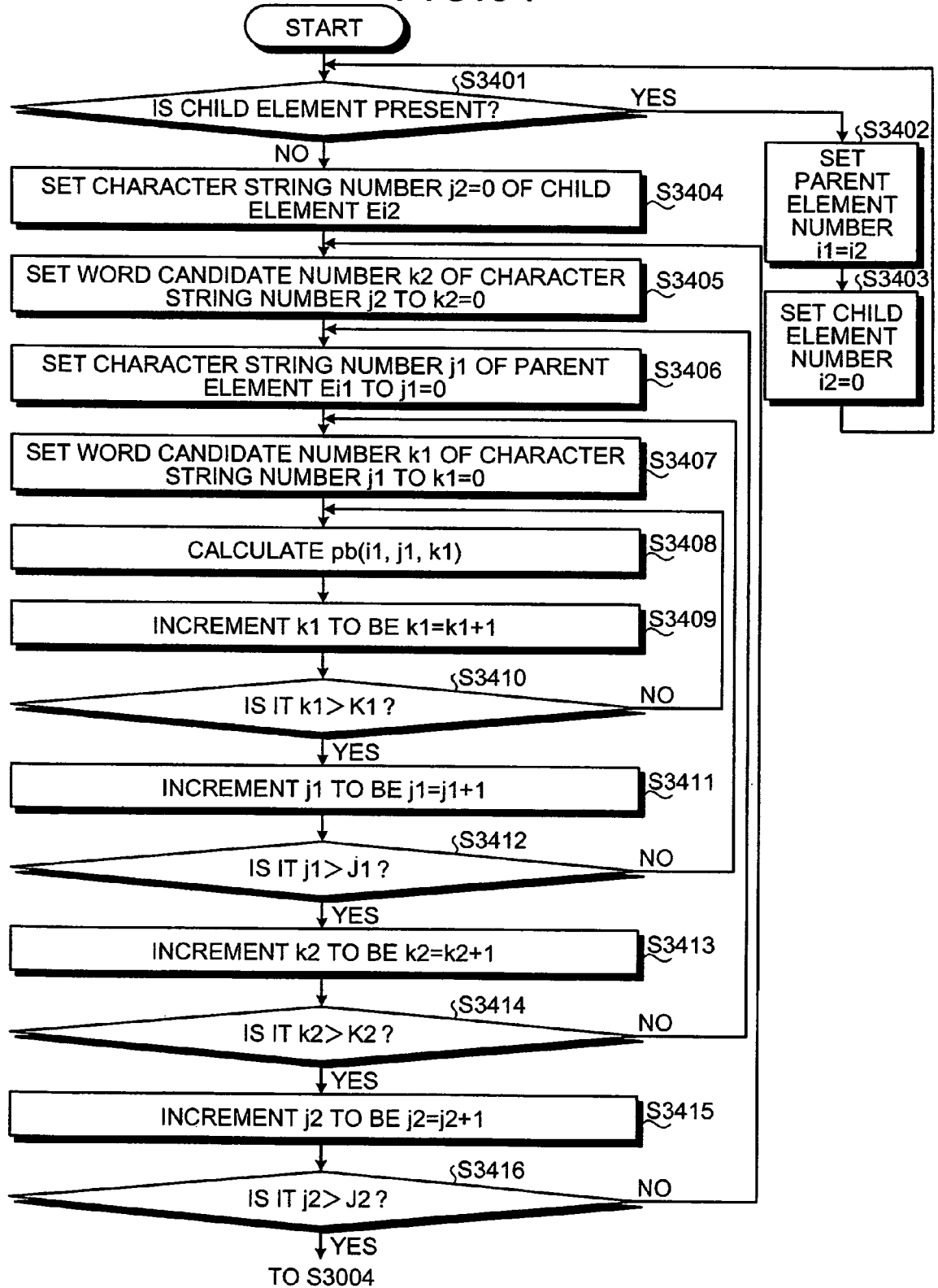
FIG. 34 is a flowchart of a specific procedure in a backward calculation process shown in FIG. 33.

FIG. 34 is a flowchart of a specific procedure in the backward calculation process shown in FIG. 33. First, it is judged whether any further child element to the child element Ei2 is present (step S3401). If a child element is present (step S3401:YES), then the parent element number i1 is set to i1=i2 (step S3402). Namely, the child element Ei2 is changed to the parent element Ei2. Then, the child element number i2 is set to i2=0 (step 3403) and the process goes back to step S3401. Thus, the child element at the lowest level can be detected.

On the other hand, if no further child element is present (step S3401: NO), the character string number j2 of the child element Ei2 is set to j2=0 (step S3404) and the word candidate number k2 of the character string number j2 is set to k2=0 (step S3405). Then, the character string number j1 of the parent element Ei1 is set to j1=0 (step S3406) and the word candidate number k1 of the character string number j1 is set to k1=0 (step S3407).

Next, the probability pb(i1, j1, k1) is calculated (step S3408). The probability pb(i1, j1, k1) is calculated by the following Equation 23.

$$pb(i1, j1, k1) = \qquad (23)$$
$$p4'(i1, i2, j1, j2, k1, k2) \times pb(i2, j2, k2) \times p3'(i1, j1, k1)$$

When the child element Ei2 is the child element at lowest level, pb(i2, j2, k2) is substituted by the normalized transition probability p4'(i2, j2, k2) of such child element Ei2.

Thereafter, the word candidate number k1 of the parent element Ei1 is incremented (step S3409) and it is judged whether the word candidate number k1>K1 is satisfied (step S3410). K1 is the number of word candidates for the character string number j1 of the parent element Ei1.

If k1>K1 is not satisfied (step S3410: NO), the process returns back to step S3408 to calculate the probability pb(i1, j1, k1). On the other hand, if k1>K1 is satisfied (step S3410: YES), then the character string number j1 of the parent element Ei1 is incremented (step S3411) and it is judged whether the character string number j1>J1 is satisfied (step S3412). Here, J1 is the number of corresponding character strings of the parent element Ei1.

If j1>J1 is not satisfied (step S3412: NO), then the process goes back to step S3407. On the other hand, if j1>J1 is satisfied (step S3412: YES), the word candidate number k2 of the child element Ei2 is incremented (step S3413) and it is judged whether the word candidate number k2>K2 is satisfied (step S3414). K2 is the number of word candidates for the character string number j2 of the child element Ei2.

If k2>K2(i2, j2) is not satisfied (step S3414: NO), then the process goes back to step S3406. On the other hand, if k2>K2 is satisfied (step S3414: YES), the character string number j2 of the child element Ei2 is incremented (step S3415) and it is judged whether the character string number j2>J2 is satisfied (step S3416). J2 is the number of corresponding character strings of the child element Ei2.

If j2>J2 is not satisfied (step S3416: NO), the process returns back to step S3405. On the other hand, if j2>J2 is satisfied (step S3416:YES), the backward calculation process is finished and the process goes to step S3004. In this manner, the backward calculation process is executed until the parent element at the uppermost level is reached.

Figure 35:
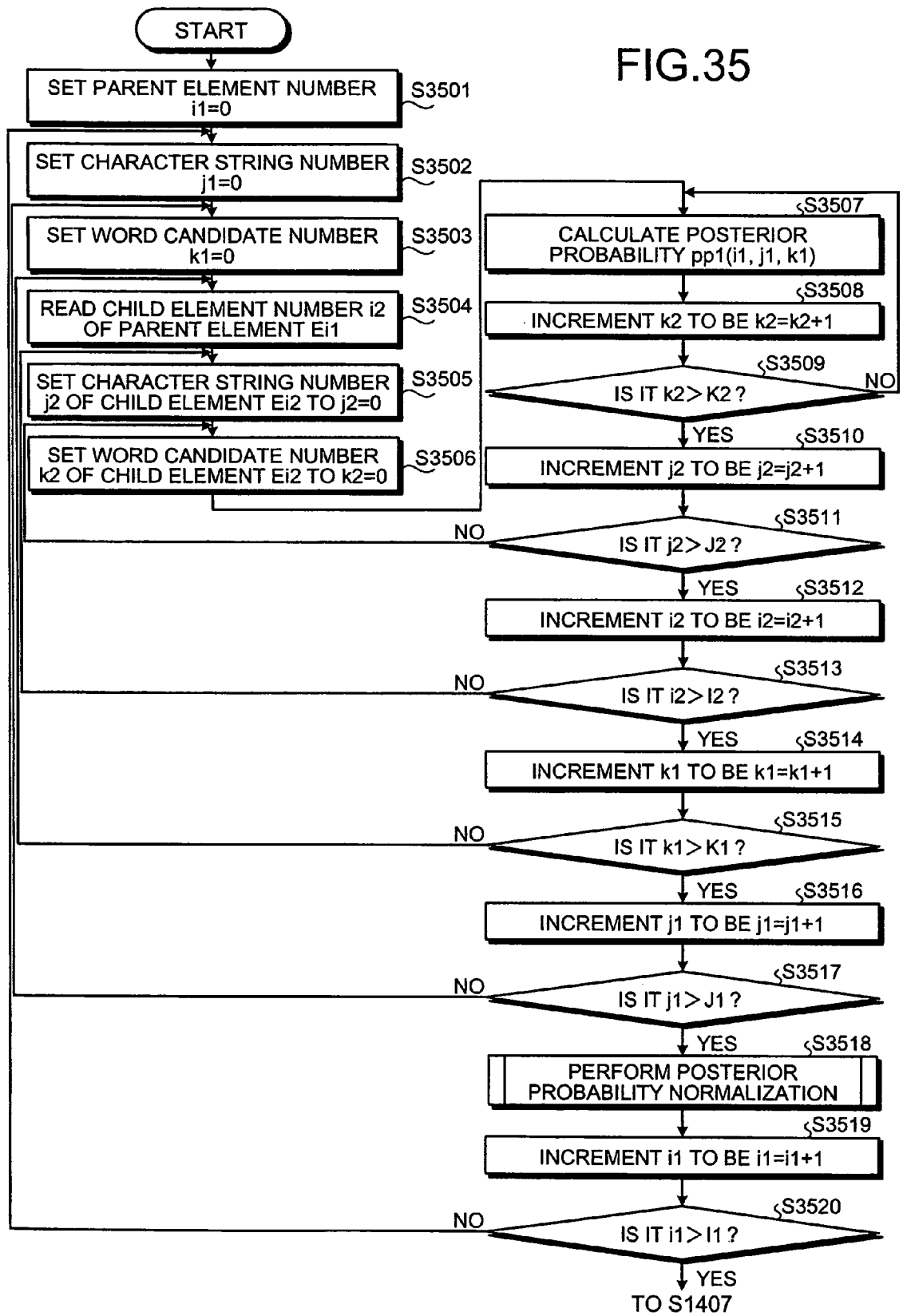
FIG. 35 is a flowchart of a specific procedure in the posterior probability calculation process.

FIG. 35 is a flowchart of a specific procedure in the posterior probability calculation process. First, the parent element number i1 is set to i1=0 (step S3501), the character string number j1 thereof is set to j1=0 (step S3502), and the word candidate number k1 is set to k1=0 (step S3503). Then, the child element number i2 of the child element Ei2 of the parent element Ei1 is read (step S3504). Next, the character string number j2 of this child element Ei2 is set to j2=0 (step S3505) and the word candidate number k2 of the child element Ei2 is set to k2=0 (step S3506).

Using Equations 14 to 17, the posterior probability pp1(i1, j1, k1) regarding the parent element number i1, character string number j1, and the word candidate number k1 is calculated (step S3507).

Thereafter, the word candidate number k2 of the child element Ei2 is incremented (step S3508) and it is judged whether the word candidate number k2>K2 is satisfied (step S3509). K2 is the number of word candidates for the character string number j2 of the child element Ei2.

If k2>K2 does not apply (step S3509: NO), then the process goes pack to the step 3507. On the other hand, if k2>K2 is satisfied (step S3509: YES), then the character string number j2 of the child element Ei2 is incremented (step S3510). Then, it is judged whether the character string number j2>J2 is satisfied (step S3511). J2 is the number of corresponding character strings of the child element Ei2.

If j2>J2 does not apply (step S3511: NO), then the process goes back to step S3506. On the other hand, if j2>J2 applies (step S3511: YES), then the child element number i2 is incremented (step S3512) and it is judged whether i2>I2 is satisfied (step S3513). I2 is the number of elements of the child element Ei2.

If i2>I2 is not satisfied (step S3513: NO), the process returns back to step S3505. On the other hand, if i2>I2 is satisfied (step S3513: YES), the word candidate number k1 of the parent element Ei1 is incremented (step S353514) and it is judged whether the word candidate number k1>K1 is satisfied (step S3515). K1 is the number of word candidates for the character string number j1 of the parent element Ei1.

If k1>K1 does not apply (step S3515: NO), then the process goes back to step S3504. On the other hand, if k1>K1 applies (step S3515: YES), then the character string number j1 of the parent element Ei1 is incremented (step S3516) and it is judged whether the character string number j1>J1 applies (step S3517). J1 is the number of corresponding character strings of the parent element Ei1.

If j1>J1 is not satisfied (step S3517: NO), the process goes back to step S3503. On the other hand, if j1>J1 is satisfied (step S3517: YES), a posterior probability normalization processing is executed (step S3518). This processing will be described later.

Then, the element number i1 of the parent element Ei1 is incremented (step 3519) and it is judged whether the parent element number i1>I1 is satisfied (step S3520). I1 is the number of elements of the parent element Ei1.

If i1>I1 is not satisfied (step S3520: NO), the process goes back to step S3502. On the other hand, if i1>I1 is satisfied (step S3520: YES), then the posterior probability calculation process is finished and the process goes to the word determination process (step S1407).

Figure 36:
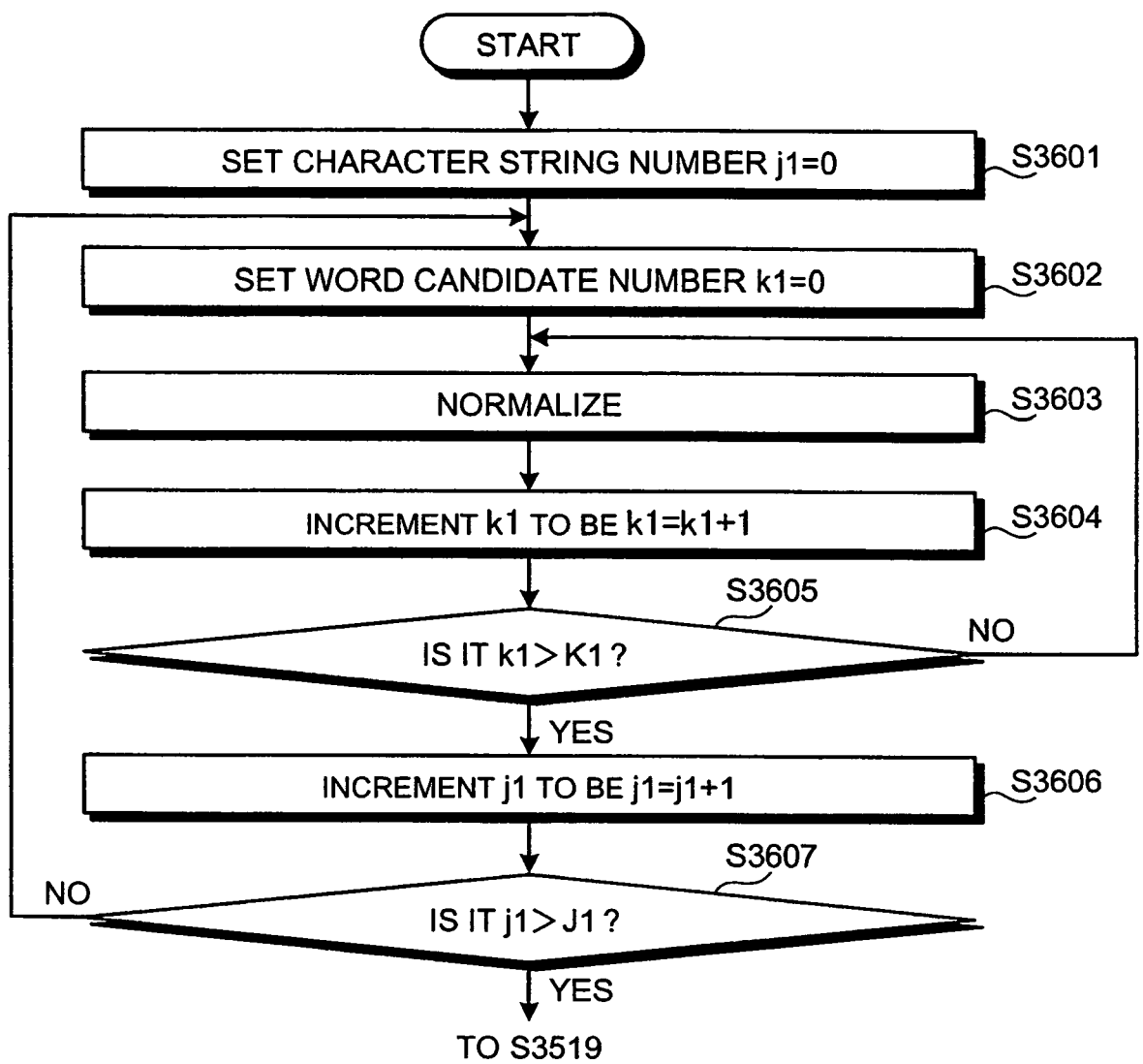
FIG. 36 is a flowchart of a posterior probability normalization process.

FIG. 36 is a flowchart of a procedure in the posterior probability normalization process. First, the character string number j1 of the parent element Ei1 is set to j1=0 (step S3601) and the word candidate number k1 thereof is set to k1=0 (step S3602).

Then, the posterior probability pp1 (i1, j1, k1) calculated at step S3507 is read out and normalized (step S3603). Normalization is performed by dividing the read posterior probability pp1(i1, j1, k1) by the total of all posterior probabilities pp1 within the element Ei1. The normalized posterior probability pp1 is hereinafter referred to as a posterior probability ppn1.

Next, the word candidate number k1 of the parent element Ei1 is incremented (step S3604) and it is judged whether the word candidate number k1>K1 is satisfied (step S3605). K1 is the number of word candidates for the character string number j1 of the parent element Ei1.

If k1>K1 is not satisfied (step S3605: NO), the process goes back to step S3603. On the other hand, if k1>K1 is satisfied (step S3605: YES), the character string number j1 of the parent element Ei1 is incremented (step S3606) and it is judged whether the character string number j1>J1 is satisfied (step S3607). Here, J1 is the number of corresponding character strings of the parent element Ei1.

If j1>J1 is not satisfied (step S3607: NO), the process goes back to step S3602. On the other hand, if j1>J1 is satisfied (step S3607: YES), the posterior probability normalization process is finished and the process goes to step S3519.

The determining unit 1305 determines words according to the probabilities obtained at the evaluating unit 1404. The determining unit 1305 outputs the word candidate giving the highest probability, to the element that has the word candidate giving the highest probability among all elements, as a determined word. Alternatively, the word candidate having a higher probability than a certain threshold value may be determined as a determined word.

Furthermore, more than one word candidate may be stored at the same time in the same element. In such a case, since other word candidate that has a determined element does not exist as same element, the emission probability thereof should be 0 or a very small value. In addition, when an element has a word candidate whose character string overlaps the character strings of such word candidates, the emission probability of such word candidate of such element should be 0 or a very small value.

For simplification, it is assumed that the system has the generic logical structure regarding the heading of payment date and the data, that, as a word candidate of the element of heading, the "payment date" is extracted by the candidate extracting unit 1301, and that the emission probability thereof is a. It is also assumed that, as the word candidate of data, "2006.8.1" and "2006.10.1" are likewise extracted and that the emission probability thereof is b.

The transition probability from a word candidate "payment date" to a word candidate "2006.8.1" is given 0.4 and the transition probability to a word candidate "2006.10.1" is given 0.2. Then, as a credibility of respective character strings to this data element, the posterior probability pp1 is calculated. The posterior probability of the word candidate "2006.8.1" is 66% and the posterior probability of the word candidate "2006.10.1" is 33%. Therefore, the word candidate to be selected is "2006.8.1".

As a volume to be used in determining word candidates, one is the posterior probability pp1 and another is the posterior probability pp2 indicating to which elements the character strings given as word candidates belong. Word candidates are determined, referring to at least either one of these two volumes.

In the calculation of the posterior probability pp2, only the word candidate giving the maximum posterior probability in each element is extracted, and an overlapping relation thereof is confirmed. With respect to overlapping character strings, on the basis of minimum rectangle surrounding each word candidate, word candidates whose rectangles overlap are assigned numbers of order as overlapping words. When this overlapping word number is expressed as s, the posterior probability pp2 for each character string is calculated. The posterior probability pp2 is expressed by Equations 24 to 26.

$$pp2(i(s),j(s),k(s))=pp21(i(s),j(s),k(s))/pp22(s) \quad (24)$$

$$pp21(i(s),j(s),k(s))=\text{sum}\_j'\text{sum}\_k'pf(i',j',k')\times p4(i',i,j',j,k',k)\times pb(i,j,k) \quad (25)$$

$$pp22(i)=\text{sum}\_s\,\text{sum}\_j'\text{sum}\_k'pf(i'(s),j'(s),k'(s))\times p4(i',i,j',j,k',k)\times pb(i,j,k) \quad (26)$$

Since the element giving maximum posterior probability pp2 among the overlapping elements is the most suitable element for a word candidate of the character string, the character string is determined when a word candidate giving the maximum posterior probability pp1 and a word giving the maximum posterior probability pp2 matches.

Prior to the calculation of the posterior probability pp2, an element giving the maximum posterior probability is detected with respect to each word candidate. For example, as shown in FIG. 29, the word candidate "FULL NAME" is a word candidate of the element E0 and, at the same time, a word candidate of the element E3. While the posterior probability pp1 is pp1=0.946 in the element E0, the posterior probability pp1 is pp1=0.0 in the element E3.

Thus, the word candidate "FULL NAME" overlaps at the element E0 and at the element E3, and the posterior probability pp2 is calculated to see which element is more suitable. Referring to FIG. 29, the probability pb of the word candidate "FULL NAME" in the element E0 is pb=0.0144, and the probability pf of the same word candidate in the element E3 is pf=0.0.

In this case, the posterior probability pp2 with respect to the element E0 is calculated as follows.

$$Pp2=pb/(pf+pb)=0.0144/(0.0144+0.0)=100\%$$

On the other hand, the posterior probability pp2 with respect to the element E3 is calculated as follows.

$$Pp2=pf/(pf+pb)=0.0/(0.0144+0.0)=0\%$$

In the comparison of the two posterior probabilities pp2, since the posterior probability pp2 of the element E0 is larger, the word candidate "FULL NAME" is determined as the character string of the element E0.

In the comparison process, same operation is performed against all element number i, character string number j, and word candidate number k, and the word candidates are determined by highest posterior probabilities pp1 and pp2, and a repetition-processing end is set to 1. Alternatively, all word candidates are determined and the repetition-processing end is set to 1. If the repetition-processing end is 0, the process is finished, and the word candidates existing in the determination flag are used as determined character strings. In other cases, the following probability rewriting process is performed.

In the probability rewriting process, as to remaining elements other than the element having the maximum posterior probability pp2, the posterior probability pp1 is forcibly rewritten to pp1=00. In the above example, the word candidate "FULL NAME" is not suitable as a word candidate for any elements other than the element E0, and therefore, when the word candidate "FULL NAME" is a word candidate for another element, the emission probability p3' is rewritten to p3'=0. The rewritten value should not necessarily be 0, but may be a value comparatively small enough not to hamper the word determination.

Also as to word candidates within an element other than the word candidate of the same element showing the maximum posterior probability pp2, the emission probability p3' is forcibly rewritten to p3'=0. In the above example, since the word candidate "(FIRST NAME)" in the element E0 other than the word candidate "FULL NAME" of the element E showing the maximum posterior probability pp2 is no longer suitable as a word candidate of the element E0, its emission probability p3'=0.33 is forcibly rewritten to p3'=0.0.

A rewritten value should not necessarily be 0, but may be a value comparatively small enough not to hamper the word determination. The word candidate table after the forcible conversion of the emission probability p3' is shown in FIG. 37. FIG. 37 is a schematic of a fourth word candidate table after the forcible conversion of the emission probability p3'.

Thus, by forcibly rewriting the emission probability p3' of word candidates other than the determined word candidate to 0, irrespective of the layer of the element Ei, efficient narrowing of word candidates can be achieved. By repeatedly executing the processing by the determining unit 1305, a step by step determination can be made, when a character recognition error takes place with a word candidate and the emission probability becomes low with respect to such word candidate. By this process, an erroneous and ambiguous character string can be determined by the subsequent repetition. Therefore, the determination of a word candidate out of a small number of word candidates can be executed effectively and with a high degree of accuracy.

Figure 38:
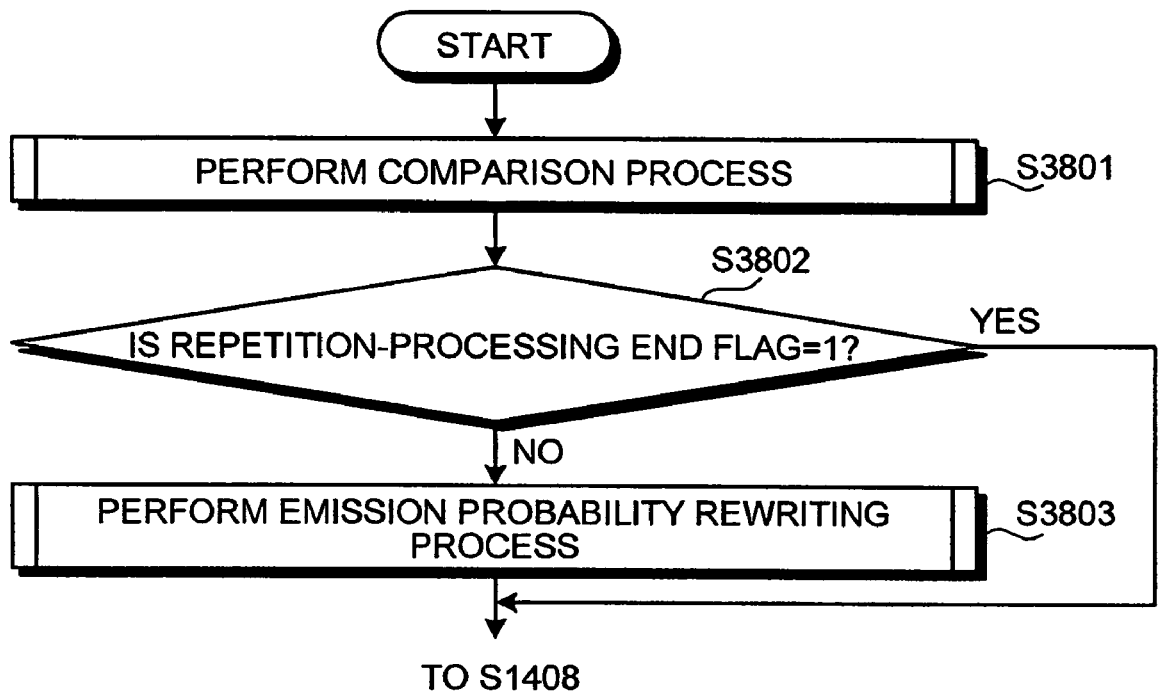
FIG. 38 is a flowchart of a word determination process by a determining unit 1305 shown in FIG. 14.

FIG. 38 is a flowchart the word determination process by the determining unit 1305 shown in FIG. 14. First, the comparison process is executed (step S3802). Next, it is judged whether the repetition-processing end flag=1 (step S3802). If the repetition-processing end flag=1 does not apply (step S3802: NO), then the probability rewriting process is executed (step S3803). On the other hand, if the repetition-processing end flag=1 (step S3802: YES), then the word determination process is finished.

Figure 39:
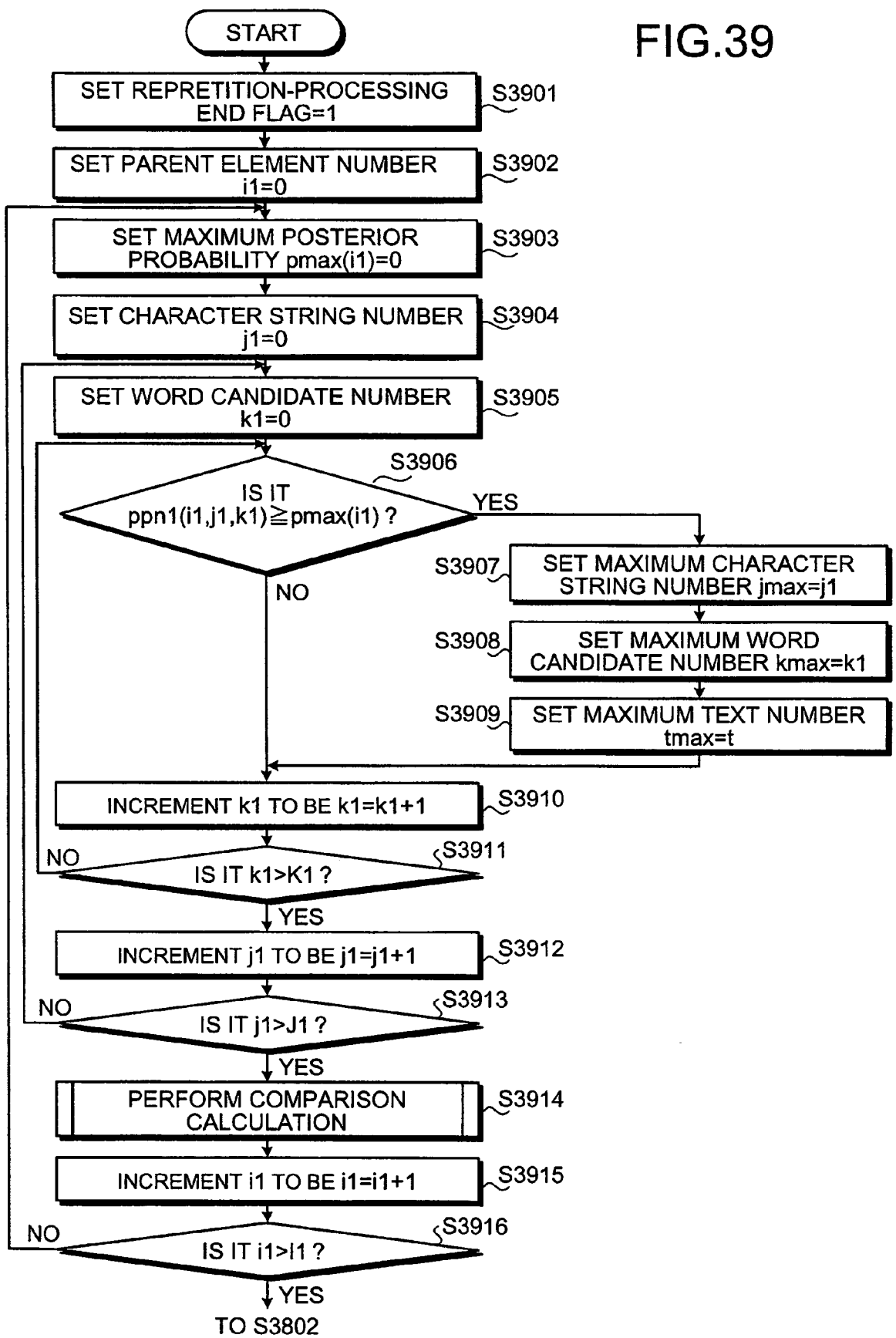
FIG. 39 is a flowchart of a specific procedure in a comparison process (step S3801) shown in FIG. 38.

FIG. 39 is a flowchart of a specific procedure in the comparison process (step S3801) shown in FIG. 38. First, the repetition-processing end flag is set to flag=1 (step S3901) and the parent element number i1 is set to i1=0 (step S3902). When the maximum posterior probability pp1 within the parent element Ei1 is expressed as pmax(i1), the maximum posterior probability pmax(i1) is set to pmax(i1)=0 (step S3903).

The character string number j1 of the parent element Ei is set to j1=0 (step S3904) and its word candidate number k1 is set to k1=0 (step S3905). Then, it is judged whether a normalized posterior probability ppn1(i1, j1, k1)≧pmax(i1) is satisfied (step S3906).

If ppn1(i1, j1, k1)≧pmax(i1) is satisfied (step S3906: YES), the maximum character string number jmax is substituted by a current character string number j1 (jmax=j1)(step S3907), the maximum word candidate number kmax is substituted by a current word candidate number k1 (kmax=k1) (step S3908), and the maximum text number tmax is substituted by the text number t assigned to the current word candidate number k1 (step S3909), and the process goes to step S3910.

On the other hand, if ppn1(i1, j1, k1)≧pmax(i1) is not satisfied (step S3906: NO), the process goes to step S3910. Then, word candidate number k1 is incremented (step S3910) and it is judged whether the word candidate number k1>K1 is satisfied (step S3911). K1 is the number of word candidates for the character string number j1 of the parent element Ei1.

If k1>K1 is not satisfied (step S3911: NO), the process goes back to step S3906. On the other hand, if k1>K1 is satisfied (step S3911: YES), then the character string number j1 of the parent element Ei1 is incremented (step S3912) and it is judged whether the character string number j1>J1 is satisfied (step S3913). J1 is the number of corresponding character strings of the parent element Ei1.

If j1>J1 is not satisfied (step S3913: NO), the process goes back to step S3905. On the other hand, if j1>J1 is satisfied (step S3913: YES), the comparison calculation process is executed (step S3914).

Then, the element number i1 of the parent element Ei1 is incremented (step S3915) and it is judged whether the parent element number i1>I1 is satisfied (step S3916). I1 is the number of parent elements of the parent element Ei1. If i1>I1 is not satisfied (step S3916: NO), the process goes back to step S3903. On the other hand, if i1>I1 is satisfied (step S3916: YES), the process goes to step S3802.

Figure 40:
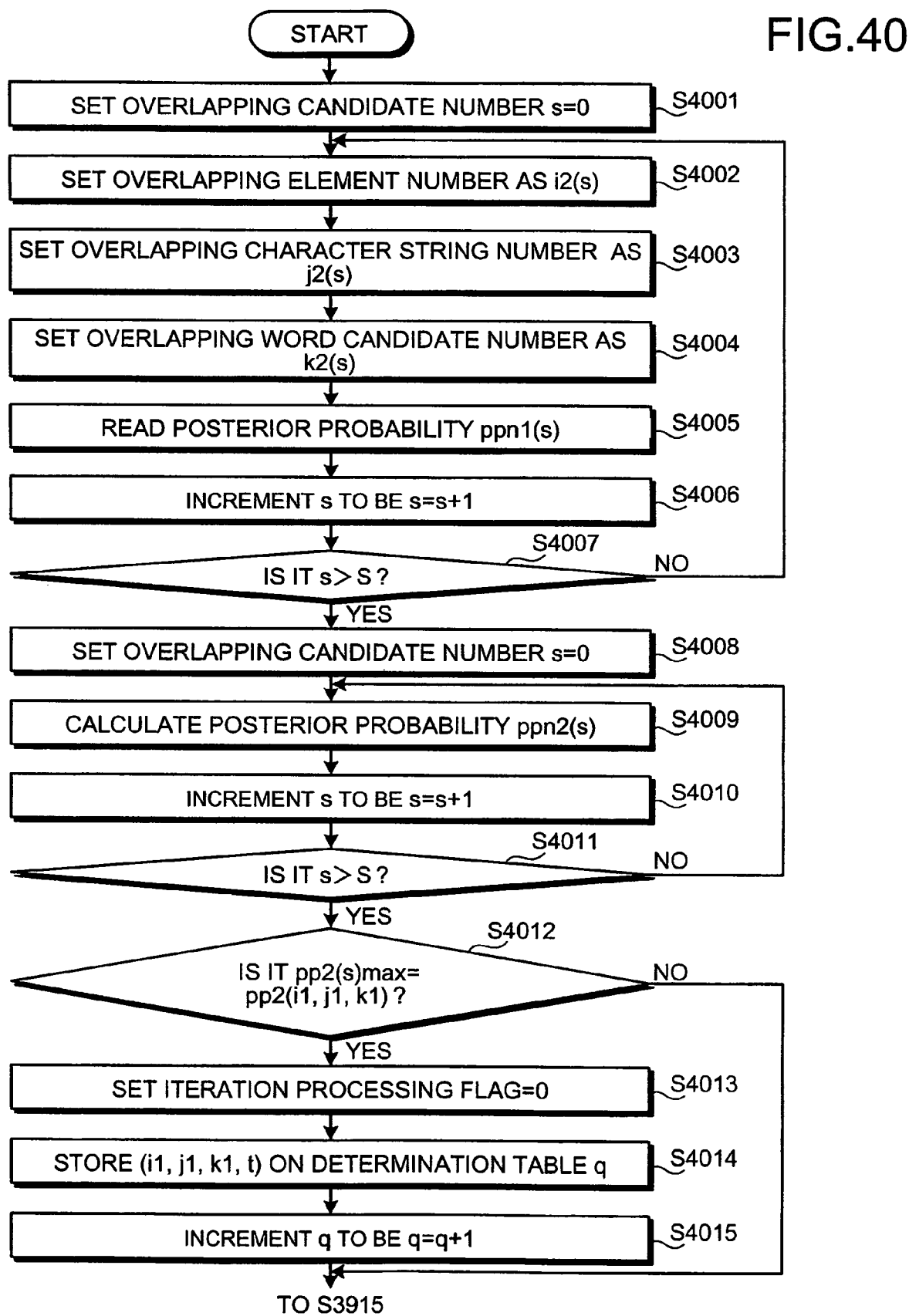
FIG. 40 is a flowchart of a comparison calculation process (step S3914) shown in FIG. 39.

FIG. 40 is a flowchart of the comparison calculation process (step S3914) shown in FIG. 39. This flowchart shows a procedure of the comparison calculation of the word candidate Wk1 of the parent element Ei1 having the text number t as the maximum text number tmax at step S3909 in FIG. 39 and its overlapping word candidate.

First, the overlapping candidate number s of the overlapping child element is set to s=0 (step S4001). Next, the element number of the child element Ei2 to which the overlapping candidate number s is assigned is expressed as i2(s) (step S4002). Overlapping child element Ei1 is expressed as an overlapping element Ei2(s).

The overlapping character string number of the overlapping element Ei2(s) is expressed as j2(s) (step S4003) and the overlapping word candidate number thereof is expressed as k2(s) (step S4004). Then, the normalized posterior probability ppn1(i2(s),j2(s), k2(s)) at this point is read out (step S4005).

Thereafter, the overlapping candidate number s is incremented (step S4006) and it is judged whether the overlapping candidate number s>S is satisfied (step S4007). Here, S is the number of overlapping elements. If s>S is not satisfied (step S4007: NO), the process goes back to step S4002. On the other hand, if s>S is satisfied (step S4007: YES), the overlapping number s is set to s=0 (step S4008).

By executing a series of processing at steps S4001 to S4007, all of the posterior probability ppn1(i2(s), j2(s), k2(s)) of the overlapping element Ei2(s) can be read.

After step S4008, posterior probability pp2(s) for the posterior probability ppn1(i2(s), j2(s), k2(s)) is calculated (step S4009). Thereafter, the overlapping candidate number s is incremented (step S4010) and it is judged whether the overlapping candidate number s>S is satisfied (step S4011). If s>S is not satisfied (step S4011: NO), the process goes back to step S4009.

On the other hand, if s>S is satisfied (step S4011: YES), the process goes to step S4012. By performing processes at step S4008 to step S4011, the calculation of the posterior probability pp2(s) for all of the posterior probability ppn1(i2(s), j2(s), k2(s)) of the overlapping element Ei2(s) can be calculated.

Then, it is judged whether the maximum value of the posterior probability pp2(s) is the posterior probability pp2(i1, j1, k1) of the word candidate Wk1 of the parent element Ei1 having the text number t as the maximum text number tmax at step S3909 in FIG. 39 (step S4012).

If it is not the posterior probability pp2(i1, j1, k1) of the word candidate Wk1 (step S4012: NO), the comparison calculation process is finished. On the other hand, if it is the posterior probability pp2(i1, j1, k1) of the word candidate Wk1 (step S4012: YES), then the repetition-processing end is set to flag=0 (step S4013) and the information (i1, j1, k1, t) is stored in the determination table q (step S4014).

Then, the determination table number q is incremented (step S4015), the comparison calculation process is finished, and the process goes to step S3915. Thus, the information (i1, j1, k1, t) identifying the word candidate to be given a priority when word candidates overlap can be stored in the determination table q.

Figure 41:
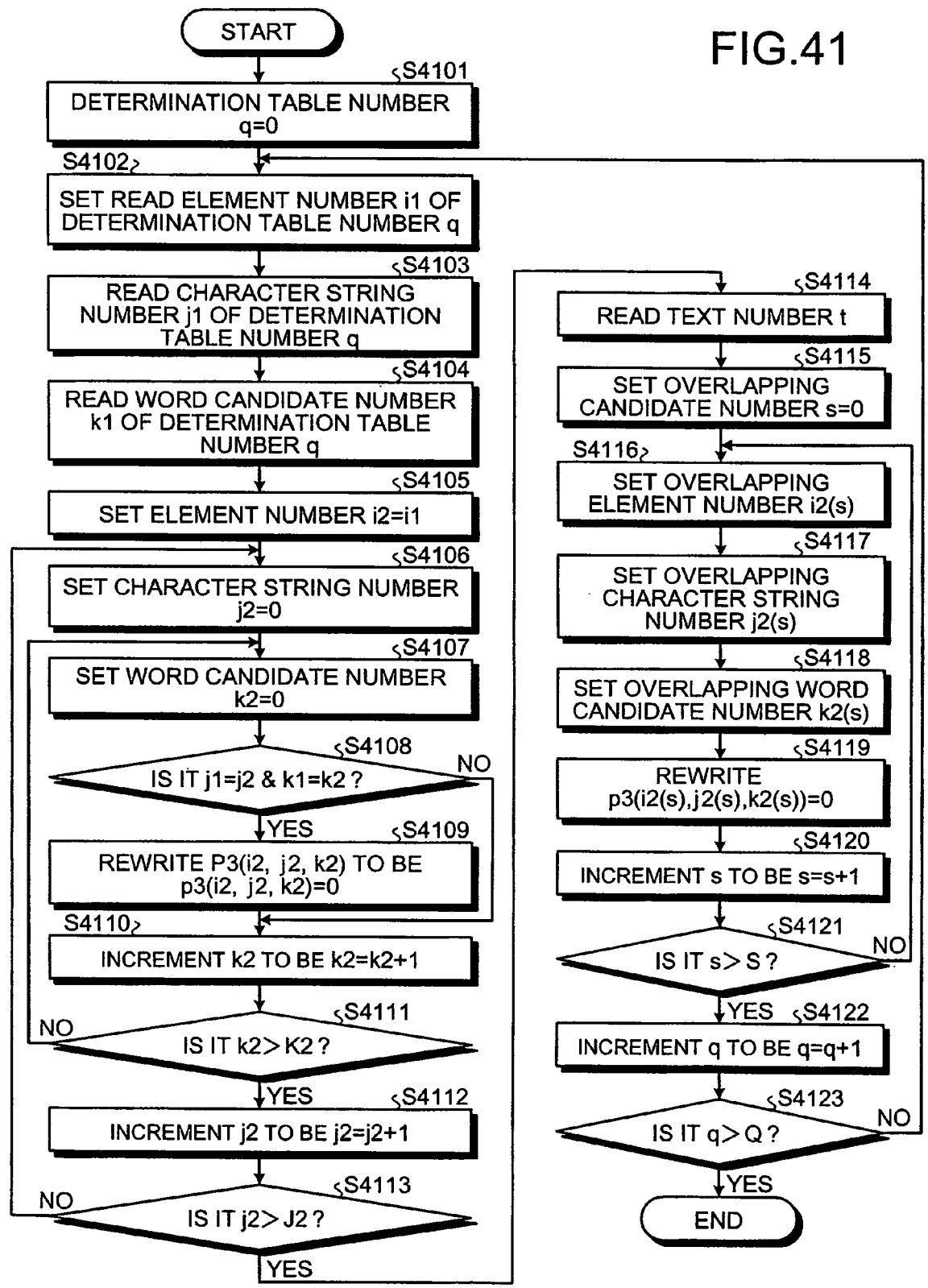
FIG. 41 is a flowchart of a specific procedure in a probability rewriting process shown in FIG. 38.

FIG. 41 is a flowchart of a specific procedure in the probability rewriting process shown at step S3803 of FIG. 38. First, the determination table number q is set to q=0 (step S4101). The element number i1, the character string number j1, and the word candidate number k1 of the determination table q are read (steps S4102 to S4104).

Then, the element number i2 of the child element Ei2 is set to i2=i1 (step S4105), the character string number j2 thereof is set to j2=0 (step S4106), and the word candidate number k2 is set to k2=0 (step S4107). Then, it is judged whether the character string number j1 of the parent element number Ei1 is j1=j2 and the word candidate number k1 is k1=k2 (step S4108).

If j1=j2 and k1=k2 is satisfied (step S4108: YES), the emission probability p3(i2, j2, k2) of the word candidate Wk2 of the character string number j2 of the child element Ei2 is forcibly rewritten to p3(i2, j2, k2)=0 (step S4109) and the process goes to step S4110. On the other hand, if j1=j2 and k1=k2 is not satisfied (step S4108: NO), then the process goes to step S4110, without rewriting the emission probability p3(i2, j2, k2).

At step S4110, the word candidate number k2 is incremented and it is judged whether k2>K2 is satisfied (step S4111). K2 is the number of word candidates for the character string number j2 of the child element Ei2.

If k2>K2 is not satisfied (step S4111: NO), the process goes back to step S4107. On the other hand, if k2>K2 is satisfied (step S4111: YES), the character string number k2 of the child element Ei2 is incremented (step S4112) and it is judged whether the character string number j2>J2 is satisfied (step S4113). J2 is the number of the corresponding character strings of the child element Wi2. If j2>J2 is not satisfied (step S4113: NO), the process goes back to step S4106.

By performing the processes at step S4102 to step S4113, the emission probability p3 of other word candidate whose emission probability is low within the same element p3 can be forcibly rewritten to be p3=0.

On the other hand, if j2>J2 is satisfied (step S4113: YES), then the current text number t of the word candidate Wk1 is read (step S4114). Next, the overlapping candidate number s of the overlapping child element Ei2 is set to s=0 (step S4115). Then, the element number of the child element Ei2 to which the overlapping number s is assigned is expressed as i2(s) (step S4116). The overlapping child element Ei2 is expressed as an overlapping element Ei2(s).

The overlapping character string number of the overlapping element Ei2(s) is expressed as j2(s) (step S4117) and the overlapping word candidate number thereof is expressed as k2(s) (step S4118). Then, the emission probability p3(i2(s), j2(s), k2(s)) of this word candidate Wk2(s) is forcibly rewritten to be p3(i2(s), j2(s), k2(s))=0 (step S4119).

Thereafter, the overlapping candidate number s is incremented (step S4120) and it is judged whether the overlapping candidate number s>S is satisfied (step S4121). S is the number of overlapping elements. If s>S is not satisfied (step S4121: NO), the process goes back to step S4116.

On the other hand, if s>S is satisfied (step S4121: YES), the determination table number q is incremented (step S4122) and it is judged whether q>Q is satisfied (step S4123). Q is the number of determination tables. If s>S is not satisfied (step S4121: NO), the process goes back to step S4102. On the other hand, if q>Q is satisfied (step S4123: YES), the probability rewriting process is finished.

As describe above, according to the above embodiment, using the layered generic logical structure, it is possible to automatically recognize headings and data in the character string information obtained from non-structured documents or form document images containing a plurality of same or similar character strings, and to associate character strings to relevant elements of logical structure.

By digitizing the measurement inside a table on the based on a cell, the relationship between words within a stabilized table can be digitized. Furthermore, an introduction of the NULL character string permits the logical structure recognition in response to missing logical elements.

Moreover, stabilized recognition can be achieved by using the information on credibility of subheadings and data in determining headings and the information on credibility of headings and data in determining subheadings. Furthermore, correlating of character strings to logical elements can be performed according to evaluation values, irrespective of upper or lower level of logical elements. Therefore, even if an ambiguous character string exists in an upper element, such character string can be recognized as belonging to a lower element by providing appropriate probabilities.

Even if the same character string is used for a plurality of headings, by referring to a degree of adaptability of data (character string) present as a child element corresponding to the logical element to such logical element, it is possible to determine to which logical element a heading corresponds.

When a plurality of logical elements acquire one character string as a word candidate, by determining such character string to belong to one of the logical elements, such character string is excluded from candidates of another of the logical elements. In such manner, word candidates can gradually be narrowed down.

As described above, with the form processing program, the recording medium, the form processing apparatus, and the form processing method according to an embodiment of the present invention, automatic recognition regarding the structure of form documents having consistency between logical elements can be achieved with a high accuracy.

The form processing method described in the embodiment of the present invention can be realized by executing a program prepared in advance on a computer such as personal computer and a workstation. This program is recorded on a computer-readable recording medium, such as an HD, an FD, a CD-ROM, an MO, and a DVD, and is executed by being read out from the recording medium by a computer. This program may be in a form of transmission medium that can be distributed through a network such as the Internet.

According to the embodiments described above, it is possible to achieve automatic recognition regarding the structure of form documents having consistency between logical elements can be achieved with a high accuracy.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores therein a form processing program that causes a computer to recognize a logical structure in a form document, using a database storing data on a hierarchical logical structure of logical elements that logically make up the form document, appearance frequency of a character string to be the logical elements, and frequency regarding relative position between the logical elements on the form document, the form processing program causing the computer to execute:

extracting a character string as a word candidate from among character strings in the form document based on correspondence with the character strings to be the logical elements stored in the database;

calculating an emission probability of the word candidate appearing as a logical element based on the appearance frequency;

calculating a transition probability that is a probability of a word candidate of one logical element and a word candidate of another logical element appearing in combination, based on the frequency regarding relative position; and calculating credibility that the word candidate of the logical element is a character string corresponding to the logical element, based on the emission probability and the transition probability.

2. The non-transitory computer-readable recording medium according to claim 1, wherein the calculating an emission probability includes calculating the emission probability based on a probability indicative of a degree of the correspondence.

3. The non-transitory computer-readable recording medium according to claim 2, wherein the calculating an emission probability includes calculating an emission probability while defining non-presence of a character string to be a logical element as one of the word candidate.

4. The non-transitory computer-readable recording medium according to claim 1, wherein
   the calculating a transition probability includes calculating a transition probability based on the frequency regarding relative position in a layout of the form document.

5. The non-transitory computer-readable recording medium according to claim 1, wherein the calculating credibility includes calculating credibility further based on a probability that, when among combinations of word candidates, a character string of a logical element of a lower layer is a word candidate of the logical element of the lower layer, a character string of a logical element of an upper layer is a word candidate of the logical element of the upper layer.

6. The non-transitory computer-readable recording medium according to claim 1, wherein the calculating credibility includes calculating credibility further based on a probability that, when among combinations of word candidates, a character string of a logical element of a higher layer is a word candidate of the logical element of the higher layer, a character string of a logical element of an lower layer is a word candidate of the logical element of the lower layer.

7. The non-transitory computer-readable recording medium according to claim 1, wherein the form processing program further causes the computer to execute determining a logical element and a word candidate thereof as a logical element and a word candidate thereof in the form document, based on the credibility.

8. The non-transitory computer-readable recording medium according to claim 7, wherein the determining includes determining, when a single word candidate is a word candidate of a plurality of logical elements, one logical element and a word candidate thereof selected based on the credibility of each of the logical elements as the logical element and the character string thereof.

9. The non-transitory computer-readable recording medium according to claim 7, wherein the determining includes determining, when a plurality of word candidates are present for a single logical element, determining the logical element and one word candidate selected based on credibility of each of the word candidates as the logical element and the character string thereof.

10. The non-transitory computer-readable recording medium according to claim 7, wherein
    the form processing program further causes the computer to execute modifying the emission probability of a word candidate that has not been selected based on the credibility to take a lower value than a current value, and
    the determining includes determining the logical element and the word candidate thereof as the logical element and a character string thereof in the form document.

11. A form processing device that recognizes a logical structure in a form document, using a database storing data on a hierarchical logical structure of logical elements that logically make up the form document, appearance frequency of a character string to be the logical elements, and frequency regarding relative position between the logical elements on the form document, the form processing apparatus comprising:

- an extracting unit that extracts a character string as a word candidate from among character strings in the form document based on correspondence with the character strings to be the logical elements stored in the database;
- an emission probability calculating unit that calculates an emission probability of the word candidate appearing as a logical element based on the appearance frequency;
- a transition probability calculating unit that calculates a transition probability that is a probability of a word candidate of one logical element and a word candidate of another logical element appearing in combination, based on the frequency regarding relative position; and
- a credibility calculating unit that calculates credibility that the word candidate of the logical element is a character string corresponding to the logical element, based on the emission probability and the transition probability.

12. A form processing method using a computer for recognizing a logical structure in a form document, using a database storing data on a hierarchical logical structure of logical elements that logically make up the form document, appearance frequency of a character string to be the logical elements, and frequency regarding relative position between the logical elements on the form document, the form processing method comprising:

- extracting a character string as a word candidate from among character strings in the form document based on correspondence with the character strings to be the logical elements stored in the database;
- calculating an emission probability of the word candidate appearing as a logical element based on the appearance frequency;
- calculating a transition probability that is a probability of a word candidate of one logical element and a word candidate of another logical element appearing in combination, based on the frequency regarding relative position; and
- calculating credibility that the word candidate of the logical element is a character string corresponding to the logical element, based on the emission probability and the transition probability.

* * * * *